(12) United States Patent
Kondo et al.

(10) Patent No.: US 7,012,648 B2
(45) Date of Patent: Mar. 14, 2006

(54) IMAGE CONVERSION METHOD AND IMAGE CONVERSION APPARATUS

(75) Inventors: Satoshi Kondo, Yawata (JP); Tetsuya Itani, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 533 days.

(21) Appl. No.: 10/109,855

(22) Filed: Apr. 1, 2002

(65) Prior Publication Data

US 2002/0171758 A1 Nov. 21, 2002

(30) Foreign Application Priority Data

Apr. 2, 2001 (JP) ............................ 2001-103231

(51) Int. Cl.
*H04N 7/01* (2006.01)
(52) U.S. Cl. .................................... 348/441
(58) Field of Classification Search ................ 348/445, 348/443, 441, 556, 558, 913
See application file for complete search history.

(56) References Cited

U.S. PATENT DOCUMENTS

| | | | | |
|---|---|---|---|---|
| 4,611,225 A | * | 9/1986 | Powers ......................... | 348/443 |
| 5,014,116 A | * | 5/1991 | Kawai ........................ | 348/436.1 |
| 5,303,044 A | * | 4/1994 | Richards ...................... | 348/445 |
| 5,315,327 A | * | 5/1994 | Suzuki ........................ | 348/439.1 |
| 5,347,312 A | * | 9/1994 | Saunders et al. ............. | 348/443 |
| 5,349,385 A | * | 9/1994 | Glenn ......................... | 348/458 |
| 5,353,119 A | * | 10/1994 | Dorricott et al. ............ | 348/446 |
| 5,754,248 A | * | 5/1998 | Faroudja ...................... | 348/474 |
| 6,144,412 A | * | 11/2000 | Hirano et al. ................ | 348/441 |
| 6,181,382 B1 | * | 1/2001 | Kieu et al. ................... | 348/459 |
| 6,307,592 B1 | * | 10/2001 | Go ............................. | 348/453 |
| 6,327,306 B1 | * | 12/2001 | Sugiyama ............... | 375/240.21 |
| 6,430,221 B1 | * | 8/2002 | Katsumata ............. | 375/240.01 |
| 6,662,218 B1 | * | 12/2003 | Mighdoll et al. ............ | 709/219 |
| 6,778,221 B1 | * | 8/2004 | Nishioka et al. ............ | 348/459 |
| 6,876,395 B1 | * | 4/2005 | Muto et al. .................. | 348/441 |
| 2001/0009444 A1 | * | 7/2001 | Sagara ........................ | 348/441 |

FOREIGN PATENT DOCUMENTS

| | | |
|---|---|---|
| JP | 11-252512 | 9/1999 |
| JP | 3018377 | 3/2000 |

* cited by examiner

*Primary Examiner*—Paulos M. Natnael
(74) *Attorney, Agent, or Firm*—Wenderoth, Lind & Ponack, L.L.P.

(57) ABSTRACT

An image conversion apparatus includes a progressive scanning converter for receiving an input image as a first interlaced scanning image having a field frequency of m (m: integer not less than 2) fields/sec, and converting the first interlaced scanning image into a first progressive scanning image having a frame frequency of m frames/sec; a frame frequency converter for converting the first progressive scanning image into a second progressive scanning image having a frame frequency of n (n: integer not less than 1) frames/second, by thinning the first progressive scanning image in frame units; and an interlaced scanning converter for converting the second progressive scanning image into a second interlaced scanning image having a field frequency of 2n fields/sec, and outputting the second interlaced scanning image.

58 Claims, 17 Drawing Sheets

☐ intra-field-interpolated pixels

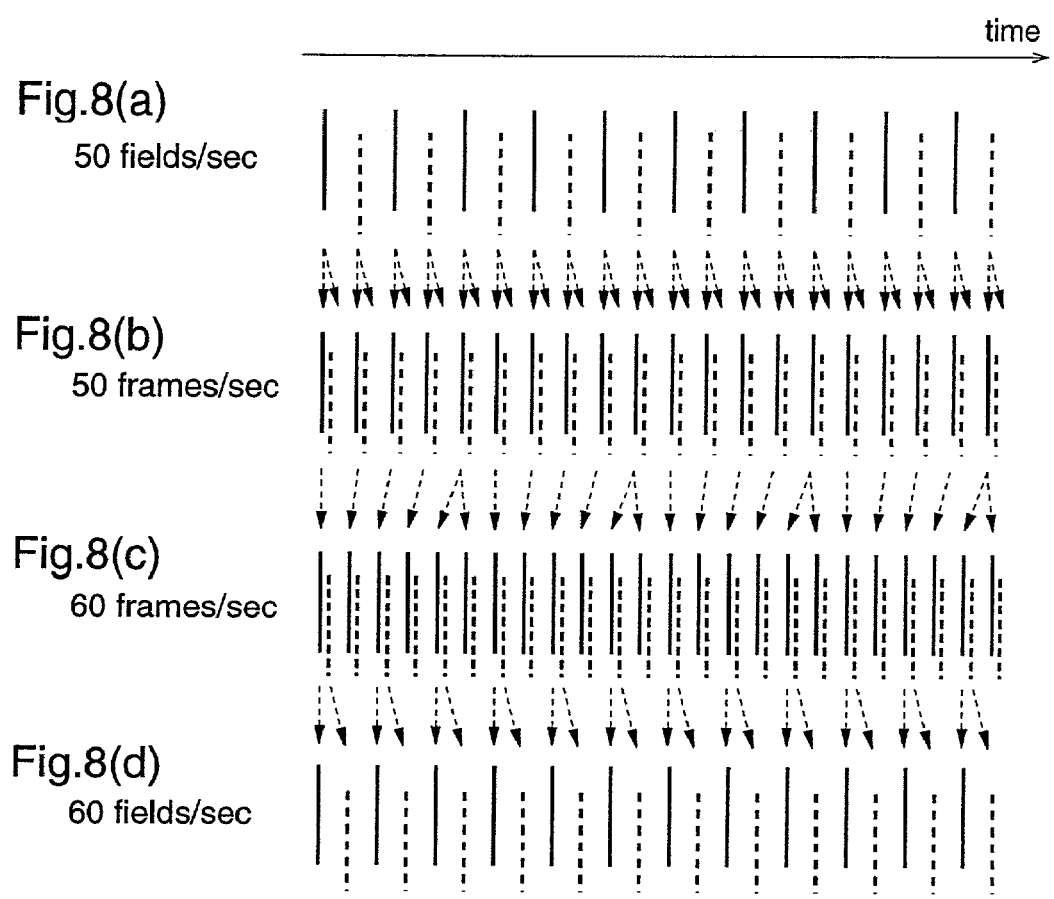

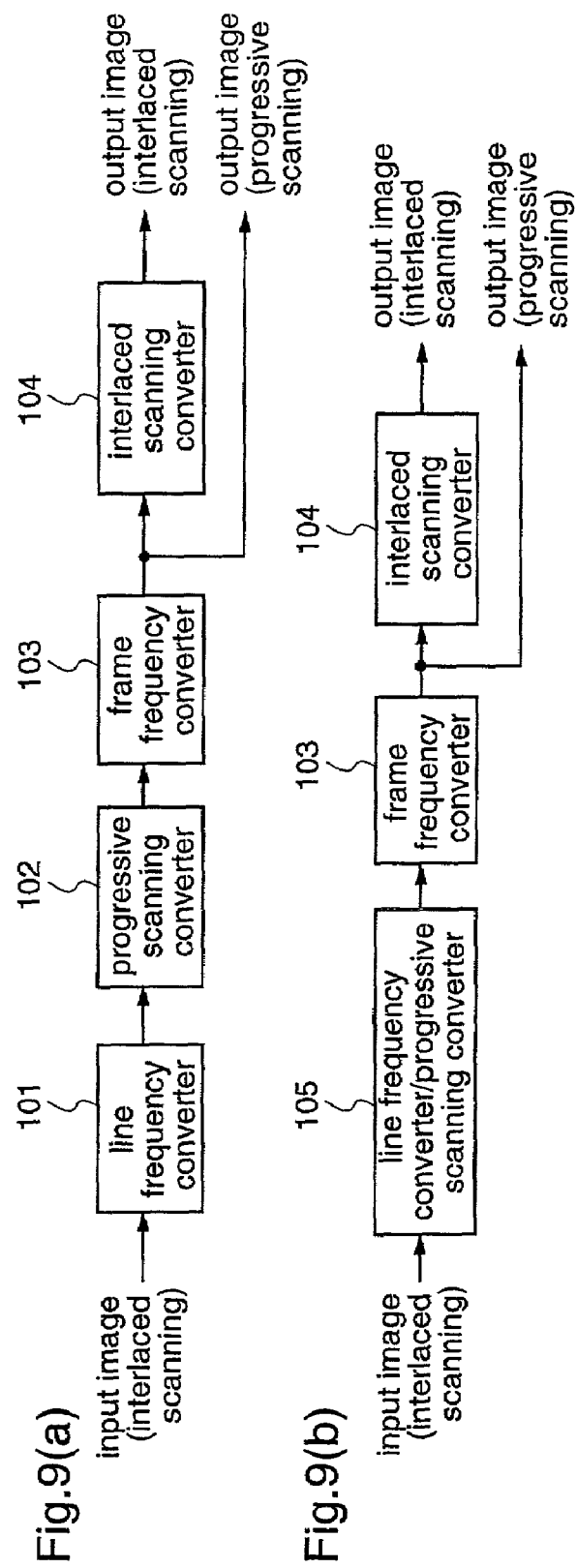

IMAGE CONVERSION METHOD AND IMAGE CONVERSION APPARATUS

FIELD OF THE INVENTION

The present invention relates to a method and an apparatus for performing field/frame frequency conversion between image formats having different field/frame frequencies, such as an NTSC (National Television System Committee) format and a PAL (Phase Alternating by Line) format.

BACKGROUND OF THE INVENTION

The field frequency of the NTSC format is 59.94 Hz, and the screen size when expressed as digital data is horizontal 720 pixels×vertical 576 pixels. On the other hand, the field frequency of the PAL format is 25 Hz, and the screen size when expressed as digital data is horizontal 720 pixels× vertical 486 pixels. Therefore, when performing conversion between the NTSC format and the PAL format, the screen size (number of pixels) in the vertical direction and the field frequency must be converted. Conversion of the screen size can easily be carried out by using an interpolation filter in the vertical direction. However, conversion of the field frequency by simply repeating or thinning the fields results in an unnatural image.

In order to solve this problem, for example, Japanese Patent No. P3018377 (literature 1) and Japanese Published Patent Application No. Hei. 11-252523 (literature 2) have been proposed. Literature 1 discloses a method of performing field frequency conversion by field interpolation employing motion vectors. Literature 2 discloses a method of performing conversion from the NTSC format to the PAL format, in which field frequency conversion is carried out by thinning an image in field units, and when this conversion causes a field inversion, the image is subjected to an inversion correcting filter, thereby providing an output image with less unnaturalness.

In the method of literature 1, it is necessary to detect motion vectors when performing field interpolation. However, detection of motion vectors requires an enormous amount of processing, resulting in an increase in costs. Further, the method of literature 1 has a problem in setting the level of motion detection precision, that is, the circuit scale is increased when the image quality is enhanced, and the image quality is degraded when the circuit scale is reduced. On the other hand, in the method of literature 2, when a field inversion occurs, the image is subjected to an inversion correcting filter. However, this inversion correcting filter causes the image to be blurred, whereby a periodic non-blurred image and a blurred image appear repeatedly, resulting in an unnatural output image. The conventional methods have the drawbacks as described above.

SUMMARY OF THE INVENTION

The present invention is made to solve the above-mentioned problems and has for its object to provide a method and an apparatus for performing conversion between different image formats such as the NTSC format and the PAL format, which can provide a natural and normal image after conversion, by a simple construction.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an image conversion method for converting an image format of an input image into a different image format of an output image, which method comprises the steps of: assuming that the input image is a first interlaced scanning image having a field frequency of m (m: integer not less than 2) fields/sec, and performing progressive scanning conversion for converting the first interlaced scanning image into a first progressive scanning image having a frame frequency of m frames/sec; performing frame frequency conversion for converting the first progressive scanning image into a second progressive scanning image having a frame frequency of n (n: integer not less than 1) frames/second, by thinning the first progressive scanning image in frame units; and performing interlaced scanning conversion for converting the second progressive scanning image into a second interlaced scanning image having a field frequency of 2n fields/ sec, and outputting the second interlaced scanning image. Therefore, when performing conversion between different image formats, image conversion can be easily carried out by intra-field interpolation without performing field interpolation using motion vectors or field frequency conversion using an inversion correcting filter as conventional, resulting in an output image whose motion in the time direction is natural.

According to a second aspect of the present invention, there is provided an image conversion method for converting an image format of an input image into a different image format of an output image, which method comprises the steps of: assuming that the input image is a first interlaced scanning image having a field frequency of m (m: integer not less than 2) fields/sec, and performing progressive scanning conversion for converting the first interlaced scanning image into a first progressive scanning image having a frame frequency of m frames/sec; and performing frame frequency conversion for converting the first progressive scanning image into a second progressive scanning image having a frame frequency of n (n: integer not less than 1) frames/sec, by repeating or thinning the first progressive scanning image in frame units, and outputting the second progressive scanning image. Therefore, when performing conversion between different image formats, image conversion can be easily carried out by intra-field interpolation without performing field interpolation using motion vectors or field frequency conversion using an inversion correcting filter as conventional, resulting in an output image whose motion in the time direction is natural.

According to a third aspect of the present invention, there is provided an image conversion method for converting an image format of an input image into a different image format of an output image, which method comprises the steps of: assuming that the input image is a first interlaced scanning image having a field frequency of m (m: integer not less than 2) fields/sec, and performing progressive scanning conversion for converting the first interlaced scanning image into a first progressive scanning image having a frame frequency of m frames/sec; performing frame frequency conversion for converting the first progressive scanning image into a second progressive scanning image having a frame frequency of n (n: integer not less than 2) frames/sec, by repeating or thinning the first progressive scanning image in frame units; performing interlaced scanning conversion for converting the second progressive scanning image into a second interlaced scanning image having a field frequency of n fields/ sec; and outputting the second progressive scanning image and the second interlaced scanning image simultaneously. Therefore, when performing conversion between different image formats, image conversion can be easily carried out by intra-field interpolation without performing field interpolation using motion vectors or field frequency conversion using an inversion correcting filter as conventional. As a result, a progressive scanning image and an interlaced scanning image, whose motions in the time direction are natural, can be simultaneously obtained as output images.

According to a fourth aspect of the present invention, there is provided an image conversion method for converting an image format of an input image into a different image format of an output image, which method comprises the steps of: assuming that the input image is a first interlaced scanning image having a field frequency of m (m: integer not less than 2) fields/sec and an image size of horizontal h pixels×vertical v pixels, and performing progressive scanning conversion for converting the first interlaced scanning image into a first progressive scanning image having a frame frequency of m frames/sec and an image size of horizontal i pixels×vertical w pixels; performing frame frequency conversion for converting the first progressive scanning image into a second progressive scanning image having a frame frequency of n (n: integer not less than 1) frames/sec and an image size of horizontal i pixels×vertical w pixels, by thinning the first progressive scanning image in frame units; and performing interlaced scanning conversion for converting the second progressive scanning image into a second interlaced scanning image having a field frequency of 2n fields/sec and an image size of horizontal i pixels×vertical w pixels. Therefore, when performing conversion between different image formats, an output image whose motion in the time direction is natural can be obtained by a simple construction.

According to a fifth aspect of the present invention, there is provided an image conversion method for converting an image format of an input image into a different image form of an output image, which method comprises the steps of: assuming that the input image is a first interlaced scanning image having a field frequency of m (m: integer not less than 2) fields/sec and an image size of horizontal h pixels×vertical v pixels, and performing progressive scanning conversion for converting the first interlaced scanning image into a first progressive scanning image having a frame frequency of m frames/sec and an image size of horizontal i pixels×vertical w pixels; and performing frame frequency conversion for converting the first progressive scanning image into a second progressive scanning image having a frame frequency of n (n: integer not less than 1) frames/sec and an image size of horizontal i pixels×vertical w pixels, by repeating or thinning the first progressive scanning image in frame units, and outputting the second progressive scanning image. Therefore, when performing conversion between different image formats, image conversion can be easily carried out by intra-field interpolation without performing field interpolation using motion vectors or field frequency conversion using an inversion correcting filter as conventional, resulting in an output image whose motion in the time direction is natural.

According to a sixth aspect of the present invention, there is provided an image conversion method for converting an image format of an input image into a different image format of an output image, which method comprises the steps of: assuming that the input image is a first interlaced scanning image having a field frequency of m (m: integer not less than 2) fields/sec and an image size of horizontal h pixels× vertical v pixels, and performing progressive scanning conversion for converting the first interlaced scanning image into a first progressive scanning image having a frame frequency of m frames/sec and an image size of horizontal i pixels×vertical w pixels; performing frame frequency conversion for converting the first progressive scanning image into a second progressive scanning image having a frame frequency of n (n: integer not less than 2) frames/sec and an image size of horizontal i pixels×vertical w pixels, by repeating or thinning the first progressive scanning image in frame units; performing interlaced scanning conversion for converting the second progressive scanning image into a second interlaced scanning image having a field frequency of n fields/sec and an image size of horizontal i pixels× vertical w pixels; and outputting the second progressive scanning image and the second interlaced scanning image simultaneously. Therefore, when performing conversion between different image formats, image conversion can be easily carried out by intra-field interpolation without performing field interpolation using motion vectors or field frequency conversion using an inversion correcting filter as conventional. As a result, a progressive scanning image and an interlaced scanning image, whose motions in the time direction are natural, can be simultaneously obtained as output images by a simple construction.

According to a seventh aspect of the present invention, in the image conversion method according to any of the first to sixth aspects, line frequency conversion for converting the line frequency of the input image into the line frequency of the image format of the output image is carried out, and thereafter, the progressive scanning conversion is carried out. Therefore, image conversion can be realized using a relatively simple method such as intra-field interpolation, resulting in a reduction in the amount of processing and a reduction in costs. Further, since the interpolation method does not vary from frame to frame, it is possible to provide an output image having no such unnaturalness that the resolution of the screen varies with time.

According to an eighth aspect of the present invention, in the image conversion method according to any of the first to sixth aspects, line frequency conversion for converting the line frequency of the progressive scanning image into the line frequency of the image format of the output image is carried out, and thereafter, the frame frequency conversion is carried out. Therefore, image conversion can be realized using a relatively simple method such as intra-field interpolation, resulting in a reduction in the amount of processing and a reduction in costs. Further, since the interpolation method does not vary from frame to frame, it is possible to provide an output image without such unnaturalness that the resolution of the screen varies with time.

According to a ninth aspect of the present invention, in the image conversion method according to any of the first to sixth aspects, the progressive scanning conversion is performed simultaneously with line frequency conversion for converting the line frequency of the input image into the line frequency of the image format of the output image. Therefore, image conversion can be realized using a relatively simple method such as intra-field interpolation, resulting in a reduced amount of processing. Further, since line frequency conversion and progressive scanning conversion are performed simultaneously, image conversion can be carried out at further reduced costs. Moreover, since the interpolation method does not vary from frame to frame, it is possible to obtain an output image without such unnaturalness that the resolution of the screen varies with time.

According to a tenth aspect of the present invention, in the image conversion method according to any of the first, third, fourth, and sixth aspects, the first interlaced scanning image is a PAL-format image, and the second interlaced scanning image is an NTSC-format image. Therefore, an NTSC-format image and a PAL-format image can be mutually converted, whereby image conversion without a detriment such as an unnatural motion can be realized by a simpler method than the conventional methods.

According to an eleventh aspect of the present invention, in the image conversion method according to any of the first to sixth aspects, the first interlaced scanning image is a PAL-format image, and the second progressive scanning image is a progressive scanning image having an NTSC-format image size. Therefore, an NTSC-format image and a PAL-format image can be mutually converted, whereby image conversion without a detriment such as an unnatural motion can be realized by a simpler method than the conventional methods.

According to a twelfth aspect of the present invention, in the image conversion method according to any of the first, third, fourth, and sixth aspects, the first interlaced scanning image is an NTSC-format image, and the second interlaced scanning image is a PAL-format image. Therefore, an NTSC-format image and a PAL-format image can be mutually converted, whereby image conversion without a detriment such as an unnatural motion can be realized by a simpler method than the conventional methods.

According to a thirteenth aspect of the present invention, in the image conversion method according to any of the first to sixth aspects, the first interlaced scanning image is an NTSC-format image, and the second progressive scanning image is a progressive scanning image having a PAL-format image size. Therefore, an NTSC-format image and a PAL-format image can be mutually converted, whereby image conversion without a detriment such as an unnatural motion can be realized by a simpler method than the conventional methods.

According to a fourteenth aspect of the present invention, in the image conversion method according to any of the first to—sixth aspects, the image format of the input image is judged, and the conversion of the input image is carried out on the basis of the result of the judgement. Therefore, image conversion can be carried out on the basis of the image format of the input image which is automatically judged.

According to a fifteenth aspect of the present invention, in the image conversion method according to the fourteenth aspect, when the result of the judgement is that the input image is an NTSC-format image, the input image is converted into a PAL-format image; and when the result of the judgement is that the input image is a PAL-format image, the input image is converted into an NTSC-format image. Therefore, an NTSC-format image and a PAL-format image can be mutually converted, whereby image conversion without a detriment such as an unnatural motion can be realized by a simpler method than the conventional methods.

According to a sixteenth aspect of the present invention, in the image conversion method according to the fifteenth aspect, the image converted into the PAL format and the image converted into the NTSC format are outputted simultaneously. Therefore, a PAL-format image and an NTSC-format image can be obtained simultaneously as output images.

According to a seventeenth aspect of the present invention, in the image conversion method according to the fourteenth aspect, when the image format of the input image is identical to the image format of the output image, the input image is outputted as the output image; and when the image format of the input image is different from the image format of the output image, the input image is converted into the image format of the output image. Therefore, the amount of processing can be reduced when the image format of the input image is identical to the image format of the output image.

According to an eighteenth aspect of the present invention, there is provided an image conversion apparatus for converting an image format of an input image into a different image format of an output image, which apparatus comprises: a progressive scanning converter for receiving the input image as a first interlaced scanning image having a field frequency of m (m: integer not less than 2) fields/sec, and converting the first interlaced scanning image into a first progressive scanning image having a frame frequency of m frames/sec; a frame frequency converter for converting the first progressive scanning image into a second progressive scanning image having a frame frequency of n (n: integer not less than 1) frames/second, by thinning the first progressive scanning image in frame units; and an interlaced scanning converter for converting the second progressive scanning image into a second interlaced scanning image having a field frequency of 2n fields/sec, and outputting the second interlaced scanning image. Therefore, when performing conversion between different image formats, image conversion can be easily carried out by intra-field interpolation without performing field interpolation using motion vectors or field frequency conversion using an inversion correcting filter as conventional. As a result, an output image whose motion in the time direction is natural can be obtained by a simple construction.

According to a nineteenth aspect of the present invention, there is provided an image conversion apparatus for converting an image format of an input image into a different image format of an output image, which apparatus comprises: a progressive scanning converter for receiving the input image as a first interlaced scanning image having a field frequency of m (m: integer not less than 2) fields/sec, and converting the first interlaced scanning image into a first progressive scanning image having a frame frequency of m frames/sec; and a frame frequency converter for converting the first progressive scanning image into a second progressive scanning image having a frame frequency of n (n: integer not less than 1) frames/sec, by repeating or thinning the first progressive scanning image in frame units, and outputting the second progressive scanning image. Therefore, when performing conversion between different image formats, image conversion can be easily carried out by intra-field interpolation without performing field interpolation using motion vectors or field frequency conversion using an inversion correcting filter as conventional. As a result, an output image whose motion in the time direction is natural can be obtained by a simple construction.

According to a twentieth aspect of the present invention, there is provided an image conversion apparatus for converting an image format of an input image into a different image format of an output image, which apparatus comprises: a progressive scanning converter for receiving the input image as a first interlaced scanning image having a field frequency of m (m: integer not less than 2) fields/sec, and converting the first interlaced scanning image into a first progressive scanning image having a frame frequency of m frames/sec; a frame frequency converter for converting the first progressive scanning image into a second progressive scanning image having a frame frequency of n (n: integer not less than 2) frames/sec, by repeating or thinning the first progressive scanning image in frame units; and an interlaced scanning converter for converting the second progressive scanning image into a second interlaced scanning image having a field frequency of n fields/sec, and outputting the second interlaced scanning image simultaneously with the second progressive scanning image. Therefore, when performing conversion between different image formats, a progressive scanning image and an interlaced scanning image, whose motions in the time direction are natural, can be simultaneously obtained as output images by a simple construction.

According to a twenty-first aspect of the present invention, there is provided an image conversion apparatus for converting an image format of an input image into a different image format of an output image, which apparatus comprises: a progressive scanning converter for receiving the input image as a first interlaced scanning image having a field frequency of m (m: integer not less than 2) fields/sec and an image size of horizontal h pixels×vertical v pixels, and converting the first interlaced scanning image into a first progressive scanning image having a frame frequency of m frames/sec and an image size of horizontal i pixels×vertical w pixels; a frame frequency converter for converting the first progressive scanning image into a second progressive scanning image having a frame frequency of n (n: integer not less than 1) frames/sec and an image size of horizontal i pixels× vertical w pixels, by thinning the first progressive scanning image in frame units; and an interlaced scanning converter for converting the second progressive scanning image into a second interlaced scanning image having a field frequency of 2n fields/sec and an image size of horizontal i pixels× vertical w pixels, and outputting the second interlaced scanning image. Therefore, when performing conversion between different image formats, image conversion can be easily carried out by intra-field interpolation without performing field interpolation using motion vectors or field frequency conversion using an inversion correcting filter as conventional. As a result, an output image whose motion in the time direction is natural can be obtained by a simple construction.

According to a twenty second aspect of the present invention, there is provided an image conversion apparatus for converting an image format of an input image into a different image format of an output image, which apparatus comprises: a progressive scanning converter for receiving the input image as a first interlaced scanning image having a field frequency of m (m: integer not less than 2) fields/sec and an image size of horizontal h pixels×vertical v pixels, and converting the first interlaced scanning image into a first progressive scanning image having a frame frequency of m frames/sec and an image size of horizontal i pixels×vertical w pixels; and a frame frequency converter for converting the first progressive scanning image into a second progressive scanning image having a frame frequency of n (n: integer not less than 1) frames/sec and an image size of horizontal i pixels×vertical w pixels, by repeating or thinning the first progressive scanning image in frame units, and outputting the second progressive scanning image. Therefore, when performing conversion between different image formats, image conversion can be easily carried out by intra-field interpolation without performing field interpolation using motion vectors or field frequency conversion using an inversion correcting filter as conventional. As a result, an output image whose motion in the time direction is natural can be obtained by a simple construction.

According to a twenty-third aspect of the present invention, there is provided an image conversion apparatus for converting an image format of an input image into a different image format of an output image, which apparatus comprises: a progressive scanning converter for receiving the input image as a first interlaced scanning image having a field frequency of m (m: integer not less than 2) fields/sec and an image size of horizontal h pixels×vertical v pixels, and converting the first interlaced scanning image into a first progressive scanning image having a frame frequency of m frames/sec and an image size of horizontal i pixels×vertical w pixels; a frame frequency converter for converting the first progressive scanning image into a second progressive scanning image having a frame frequency of n (n: integer not less than 2) frames/sec and a screen size of horizontal i pixels× vertical w pixels, by repeating or thinning the first progressive scanning image in frame units; and an interlaced scanning converter for converting the second progressive scanning image into a second interlaced scanning image having a field frequency of n fields/sec and an image size of horizontal i pixels×vertical w pixels, and outputting the second interlaced scanning image simultaneously with the second progressive scanning image. Therefore, when performing conversion between different image formats, image conversion can be easily carried out by intra-field interpolation without performing field interpolation using motion vectors or field frequency conversion using an inversion correcting filter as conventional. As a result, a progressive scanning image and an interlaced scanning image, whose motions in the time direction are natural, can be simultaneously obtained as output images by a simple construction.

According to a twenty-fourth aspect of the present invention, the image conversion apparatus according to any of the eighteenth to twenty-third aspects further includes a line frequency converter for converting the line frequency of the input image into the line frequency of the output image. Therefore, image conversion can be realized using a simple method such as intra-field interpolation, resulting in a reduction in the amount of processing and a reduction in costs. Further, since the interpolation method does not vary from frame to frame, it is possible to obtain an output image without such unnaturalness that the resolution of the screen varies with time.

According to a twenty-fifth aspect of the present invention, in the image conversion apparatus according to any of the eighteenth to twenty-third aspects, the progressive scanning converter performs the progressive scanning conversion simultaneously with line frequency conversion for converting the line frequency of the input image into the line frequency. Therefore, image conversion can be realized using a relatively simple method such as intra-field interpolation, resulting in a reduced amount of processing. Further, since line frequency conversion and progressive scanning conversion are performed simultaneously, image conversion can be carried out at further reduced costs. Moreover, since the interpolation method does not vary from frame to frame, it is possible to obtain an output image without such unnaturalness that the resolution of the screen varies with time.

According to a twenty-sixth aspect of the present invention, the image conversion apparatus according to any of the eighteenth to twenty-third aspects further includes a judgement means for judging the image format of the input image, and controlling the whole apparatus to perform conversion of the input image on the basis of the result of the judgement. Therefore, image conversion can be carried out on the basis of the image format of the input image which is automatically judged.

According to a twenty-seventh aspect of the present invention, in the image conversion apparatus according to the twenty-sixth aspect, the judgement means judges whether the image format of the input image is the NTSC format or the PAL format, controls the whole apparatus so as to perform image conversion into the PAL format when the image format of the input image is the NTSC format, and controls the whole apparatus so as to perform image conversion into the NTSC format when the image format of the input image is the PAL format. Therefore, an NTSC-format image and a PAL-format image can be mutually converted, whereby image conversion without a detriment such as an unnatural motion can be realized by a simpler method than the conventional methods.

According to a twenty-eighth aspect of the present invention, in the image conversion apparatus according to the twenty-seventh aspect, the judgement means controls the whole apparatus to output the image converted into the NTSC format and the image converted into the PAL format simultaneously. Therefore, an NTSC-format image and a PAL-format image can be obtained simultaneously.

According to a twenty-ninth aspect of the present invention, in the image conversion apparatus according to the twenty-sixth aspect, the judgement means judges whether or not the image format of the input image is identical to the image format of the output image, controls the whole apparatus so as to output the input image as the output image when the image format of the input image is identical to the image format of the output image, and controls the whole apparatus so as to convert the input image into the image format of the output image when the image format of the input image is different from the image format of the output image. Therefore, the amount of processing when the image format of the input image is identical to that of the output image.

According to a thirtieth aspect of the present invention, there is provided an image conversion apparatus for converting an image format of an input image into a different image format of an output image, which apparatus comprises: a judgement means for judging the image format of the input image; a first image conversion means for, when the image format of the input image is a first image format, converting it into a second image format and outputting the converted image; a second image conversion means for, when the image format of the input image is the second image format, converting it into the first image format and outputting the converted image; and a switching means for selecting either the first image conversion means or the second image conversion means on the basis of the result of the judgement by the judgement means. Therefore, when performing conversion between different image formats, the image format of the input image is automatically judged, and image conversion is carried out according to the result of the judgement, whereby an output image whose motion in the time direction is natural can be obtained.

According to a thirty-first aspect of the present invention, in the image conversion apparatus according to the thirtieth aspect, the first image format is the NTSC format, and the second image format is the PAL format. Therefore, an NTSC-format image and a PAL-format image can be mutually converted.

BRIEF DESCRIPTION OF THE DRAWINGS

FIGS. 8(a)–8(d) are schematic diagrams for explaining image conversion methods according to the third, fourth, and fifth embodiments of the present invention.

FIGS. 9(a) and 9(b) are block diagrams illustrating the constructions of image conversion apparatuses according to the fifth and tenth embodiments of the present invention.

DETAILED DESCRIPTION OF THE PREFERRED EMBODIMENTS

Hereinafter, preferred embodiments of the present invention will be described with reference to drawings. However, the embodiments described hereinafter are merely examples, and the present invention is not necessarily restricted to the embodiments.

[Embodiment 1]

Hereinafter, an image conversion apparatus according to a first embodiment of the present invention will be described. The description will be given of the case where an inputted PAL-format image signal is converted into an NTSC-format image signal. For simplification, it is assumed that the field frequency of the NTSC format is 60Hz.

FIG. 1(a) is a block diagram illustrating the construction of an image conversion apparatus according to the first embodiment.

With reference to FIG. 1(a), the image conversion apparatus is provided with a line frequency converter 101 for converting the line frequency of a PAL-format input image (an interlaced scanning image having a field frequency of 50 fields/sec) into the line frequency of the NTSC format; a progressive scanning converter 102 for converting the line-frequency-converted input image into a progressive scanning image having a frame frequency of 50 frames/sec; a frame frequency converter 103 for converting the progressive scanning image having the frame frequency of 50 frames/sec into a progressive scanning image having a frame frequency of 30 frames/sec; and an interlaced scanning converter 104 for converting the progressive scanning image having the frame frequency of 30 frames/sec into an interlaced scanning image having a field frequency of 60 fields/sec.

Hereinafter, a description will be given of a PAL/NTSC conversion method by the image conversion apparatus constructed as described above.

Figure 2:
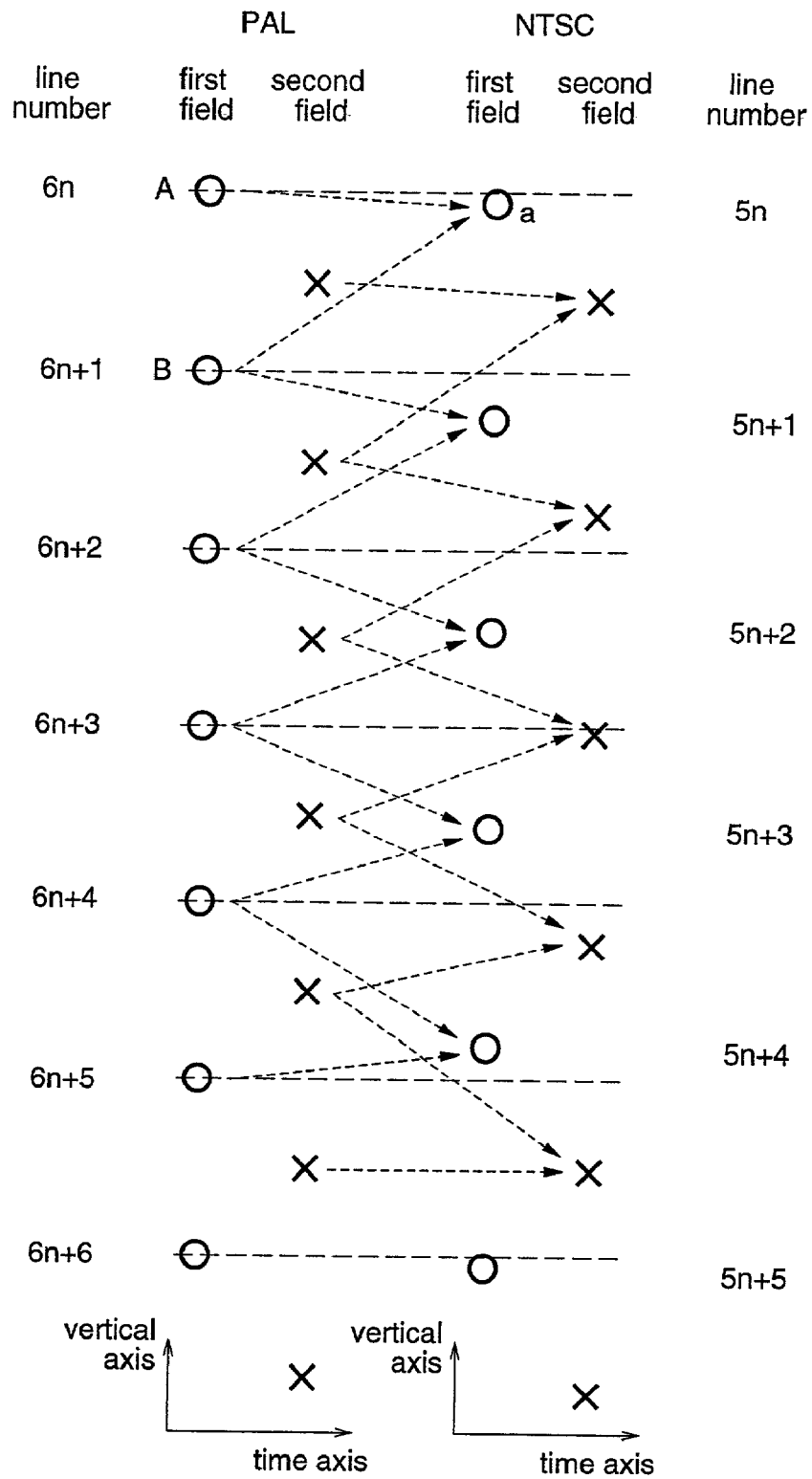
FIG. 2 is a schematic diagram for explaining line frequency conversion by a line frequency converter according to the first, third, or fifth embodiment of the present invention.

Initially, line frequency conversion will be described with reference to FIG. 2. FIG. 2 is a schematic diagram illustrating arrangements of scanning lines on a [vertical axis—time axis] plane on the basis of the PAL format and the NTSC format, respectively, for explaining an example of line frequency conversion by the line frequency converter 101. In FIG. 2, white circles indicate pixels (scanning lines), and a vertical line of white circles indicates pixels which belong to the same field.

The line frequency of an input image is converted from the line frequency of the PAL format to the line frequency of the NTSC format by the line frequency converter 101 using an interpolation filter. In FIG. 2, for example, when performing interpolation in the vertical direction using a 2-tap linear interpolation filter, a pixel at the end of an arrow is generated from a pixel at the beginning of the arrow, and a pixel "a" is generated by subjecting a pixel "A" and a pixel "B" to a filtering process. While in this first embodiment line frequency conversion is carried out using a 2-tap linear interpolation filter, it may be carried out using a filter having a different number of taps, or a different method.

In this way, in the line frequency converter 101, the number of pixels (line frequency) in the vertical direction of each field of the PAL-format input image is converted into the line frequency of the NTSC format as shown in FIG. 3(a). In the case of digital image data, one frame is composed of horizontal 720 pixels and vertical 576 pixels in the PAL format, while one frame is composed of horizontal 720 pixels and vertical 486 (or 480) pixels in the NTSC format, and therefore, line frequency conversion from the PAL format to the NTSC format can be realized by generating pixels equivalent to five lines of the NTSC format from pixels equivalent to six lines of the PAL format.

Next, a description will be given of an image conversion method after the line frequency conversion, with reference to FIGS. 3(a)–3(d). FIGS. 3(a)–3(d) are schematic diagrams illustrating arrangements of fields and frames in the time direction. In FIGS. 3(a)–3(d), solid lines indicate a first field (an image composed of odd-numbered lines when the input image is a progressive scanning image), and dashed lines indicate a second field (an image composed of even-numbered lines when the input image is a progressive scanning image).

The progressive scanning converter 102 performs progressive scanning conversion on an image having a field frequency of 50 fields/sec shown in FIG. 3(a), which image has been subjected to line frequency conversion by the line frequency converter 101, thereby generating a progressive scanning image having a frame frequency of 50 frames/sec as shown in FIG. 3(b). Although there is no conception of "field" in the progressive scanning image, the image is divided into fields in FIG. 3(b) for the sake of convenience.

Hereinafter, a method of intra-field interpolation will be described with reference to FIG. 4, as an example of progressive scanning conversion. FIG. 4 is a schematic diagram illustrating pixels in a target field to be subjected to progressive scanning conversion. In FIG. 4, circles indicate pixels existing in the field, and squares indicate pixels to be generated by interpolation. When generating an intra-field interpolated pixel, it is generated as an average value of upper and lower pixels. For example, an interpolated pixel "h" is generated as an average value of a pixel "i" and a pixel "j". FIG. 3(b) shows an arrangement of frames in an image which is so converted into a progressive scanning image. Although a method of intra-field interpolation is described as an example of progressive scanning conversion, other methods, for example, a method using inter-field interpolation such as a VT filter, a motion adaptive type method, a motion compensation type method, and the like, may be employed.

Next, in the frame frequency converter 103, frame frequency conversion is performed on the progressive scanning image having a frame frequency of 50 frames/sec shown in FIG. 3(b), which has been subjected to progressive scanning conversion by the progressive scanning converter 102. The conversion is carried out by reducing two frames from every five frames. Thereby, a progressive scanning image having a frame frequency of 30 frames/sec is generated as shown in FIG. 3(c).

Next, in the interlaced scanning converter 104, the progressive scanning image, the frame frequency of which has been converted to 30 frames/sec by the frame frequency converter 103, is converted into an interlaced scanning image. To be specific, the progressive scanning image having the frame frequency of 30 frames/sec shown in FIG. 3(c) is divided into a first field which is composed of the odd-numbered lines and a second field which is composed of the even-numbered lines, thereby obtaining an interlaced scanning image having a field frequency of 60 fields/sec as shown in FIG. 3(d). The interlaced scanning image having the field frequency of 60 fields/sec so obtained is outputted as an NTSC image.

In the above-mentioned image conversion apparatus according to the first embodiment, the line frequency of a PAL-format interlaced scanning image having a field frequency of 50 fields/sec is converted into the line frequency of the NTSC format system, and the image so obtained is converted into a progressive scanning image having a frame frequency of 50 frames/sec, and further converted into a progressive scanning image having a frame frequency of 30 frames/sec by thinning the frames uniformly with respect to time. Thereafter, the progressive scanning image so obtained is divided into fields to generate an interlaced scanning image having a field frequency of 60 fields/sec, and the generated image is outputted as an output image. Therefore, it is possible to obtain an NTSC-format interlaced scanning image whose motion in the time direction is natural. Further, since the image conversion is realized by using a relatively simple method such as intra-field interpolation, the amount of processing is reduced, and an increase in costs is avoided. Furthermore, since the interpolation method does not vary from frame to frame, it causes no unnaturalness such that the resolution of the screen varies with time.

While in this first embodiment the progressive scanning conversion by the progressive scanning converter 102 is performed after performing the line frequency conversion by the line frequency converter 101, the order of these processes can be inverted with the same effects as mentioned above.

[Embodiment 2]

Hereinafter, an image conversion apparatus according to a second embodiment of the present invention will be described. The description will be given of the case where an inputted PAL-format image signal is converted into an NTSC-format image signal. For simplification, it is premised that the field frequency of the NTSC format is 60 Hz.

Figure 1:
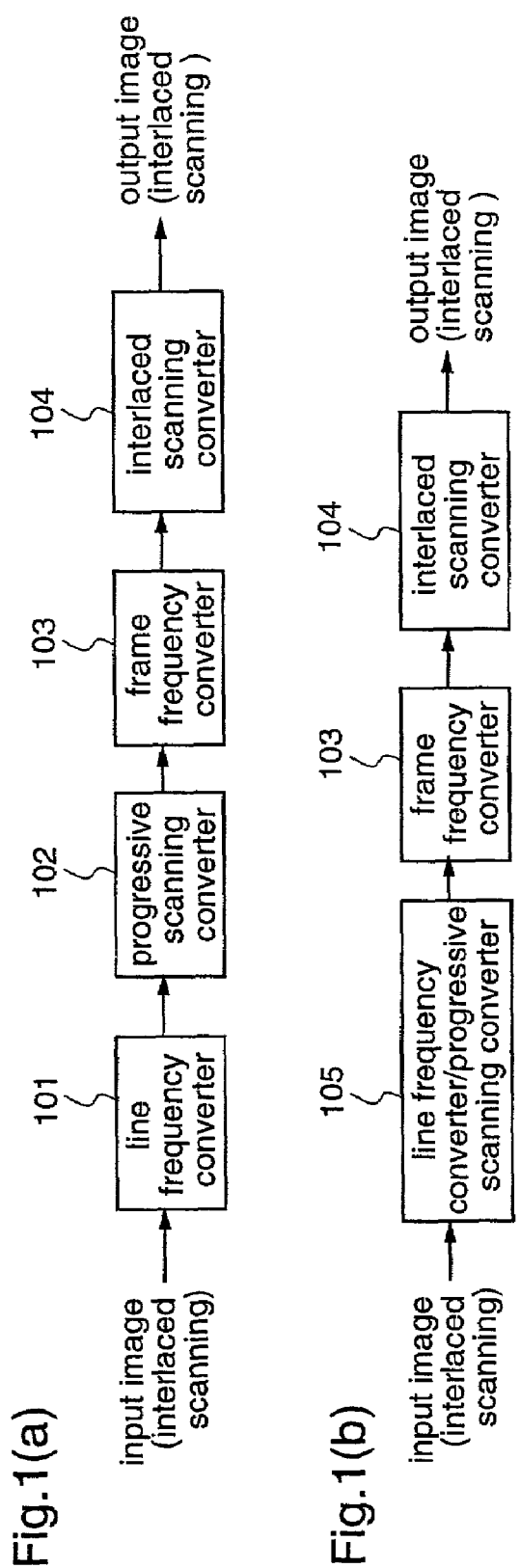
FIGS. 1(a) and 1(b) are block diagrams illustrating the constructions of an image conversion apparatus according to first, second, fifth, and sixth embodiments of the present invention.

FIG. 1(*b*) is a block diagram illustrating the construction of the image conversion apparatus according to the second embodiment.

In FIG. 1(*b*), the image conversion apparatus is provided with a line frequency converter/progressive scanning converter 105 which performs, simultaneously, line frequency conversion for converting the line frequency of a PAL-format input image (an interlaced scanning image having a field frequency of 50 fields/sec) into the line frequency of the NTSC format, and progressive scanning conversion for converting the input image into a progressive scanning image having a frame frequency of 50 frames/sec; a frame frequency converter 103 for converting the progressive scanning image having the frame frequency of 50 frames/sec into a progressive scanning image having a frame frequency of 30 frames/sec; and an interlaced scanning converter 104 for converting the progressive scanning image having the frame frequency of 30 frames/sec into an interlaced scanning image having a field frequency of 60 fields/sec.

A description will be given of a PAL/NTSC conversion method using the image conversion apparatus constructed as described above. Since the operations of the interlaced scanning converter 104 and the frame frequency converter 103 are identical to those described for the first embodiment, repeated description is not necessary. Hereinafter, the operation of the line frequency converter/progressive scanning converter 105 will be described.

Figure 5:
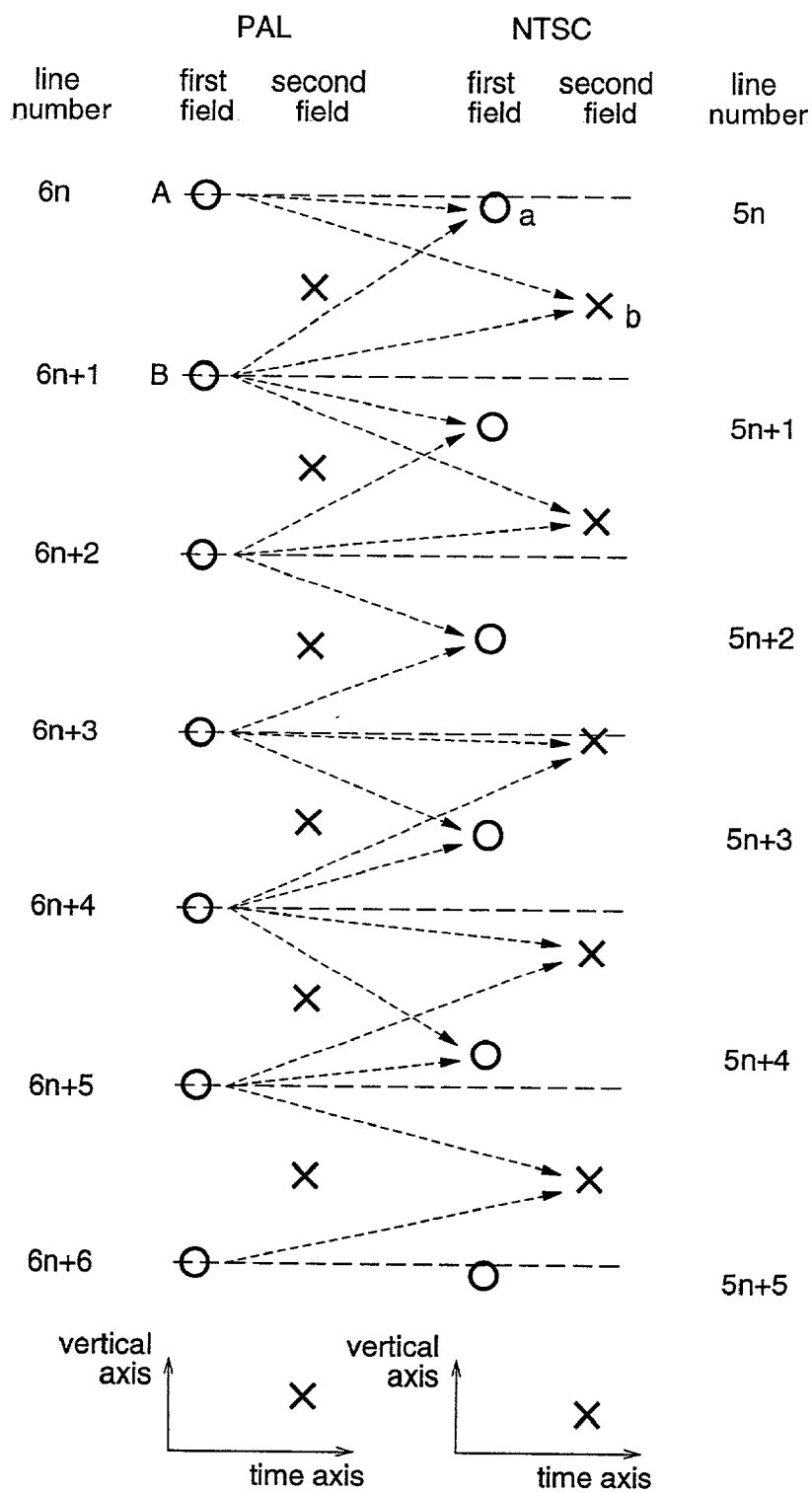
FIG. 5 is a schematic diagram for explaining the operation of a line frequency converter/progressive scanning converter which is included in the image conversion apparatus according to the second or fourth embodiments of the present invention.
Figure 6:
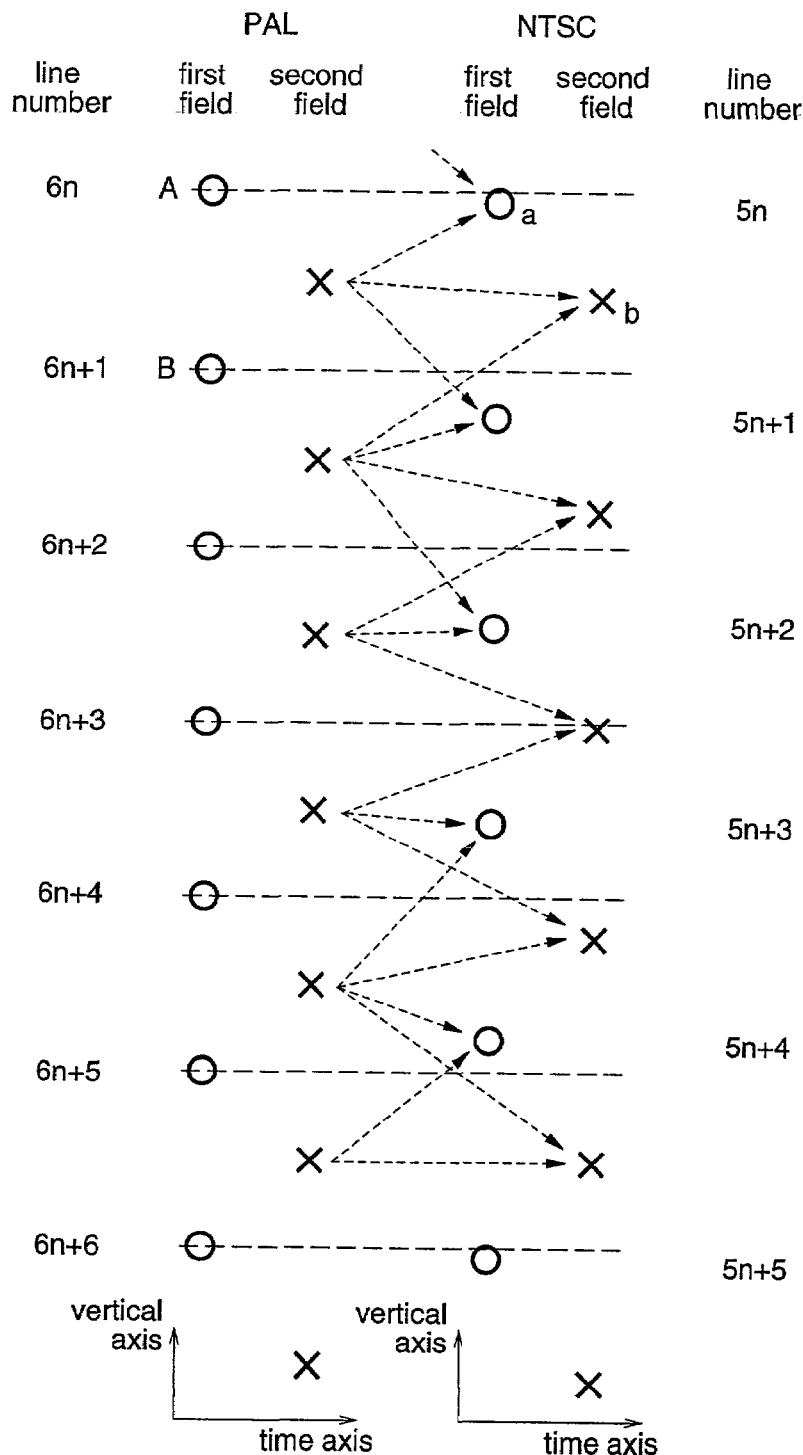
FIG. 6 is a schematic diagram for explaining the operation of the line frequency converter/progressive scanning converter which is included in the image conversion apparatus according to the second or fourth embodiments of the present invention.

Initially, in the line frequency converter/progressive scanning converter 105, as shown in FIG. 5, a progressive scanning image having the line frequency of the NTSC format is generated from an image of the first field of a PAL-format interlaced scanning image which is an input image, and furthermore, as shown in FIG. 6, a progressive scanning image having the line frequency of the NTSC format is generated from an image of the second field of the PAL-format interlaced scanning image. Thereby, a progressive scanning image having a frame frequency of 50 frames/sec is obtained as shown in FIG. 3(*b*).

Figure 3:
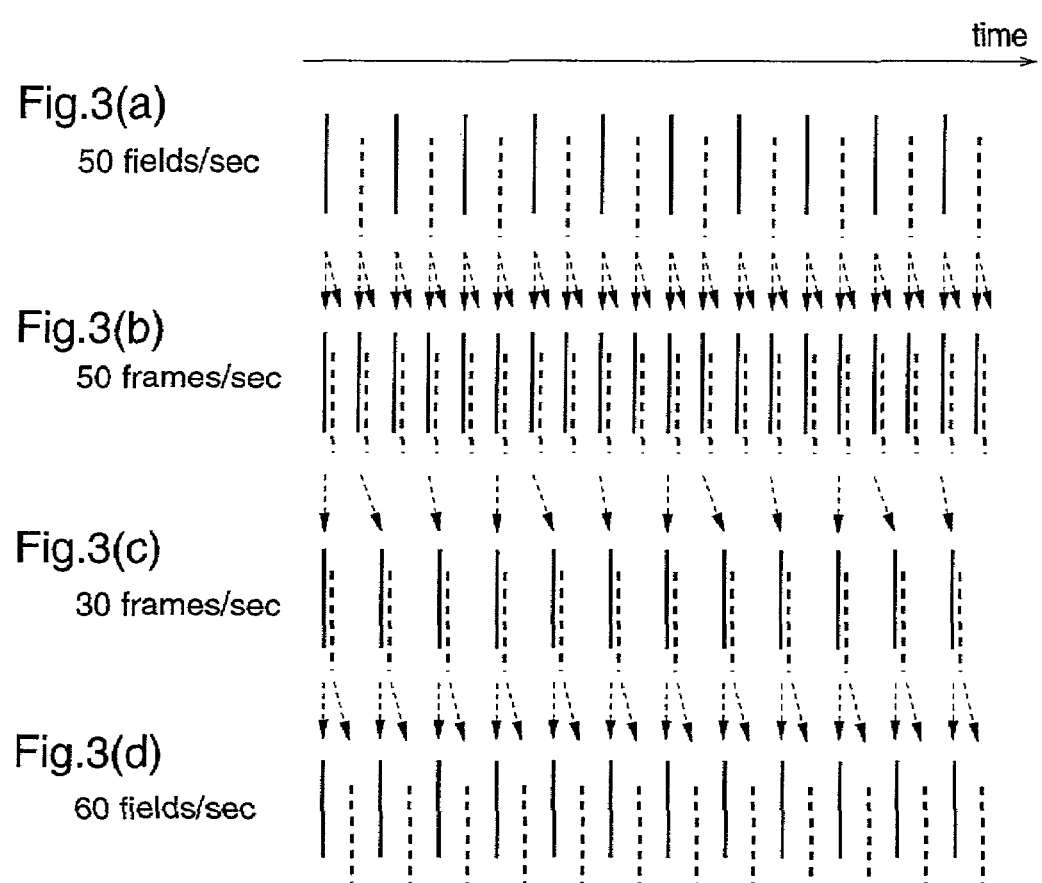
FIGS. 3(a)–3(d) are schematic diagrams for explaining image conversion methods according to the first and second embodiments of the present invention.
Figure 4:
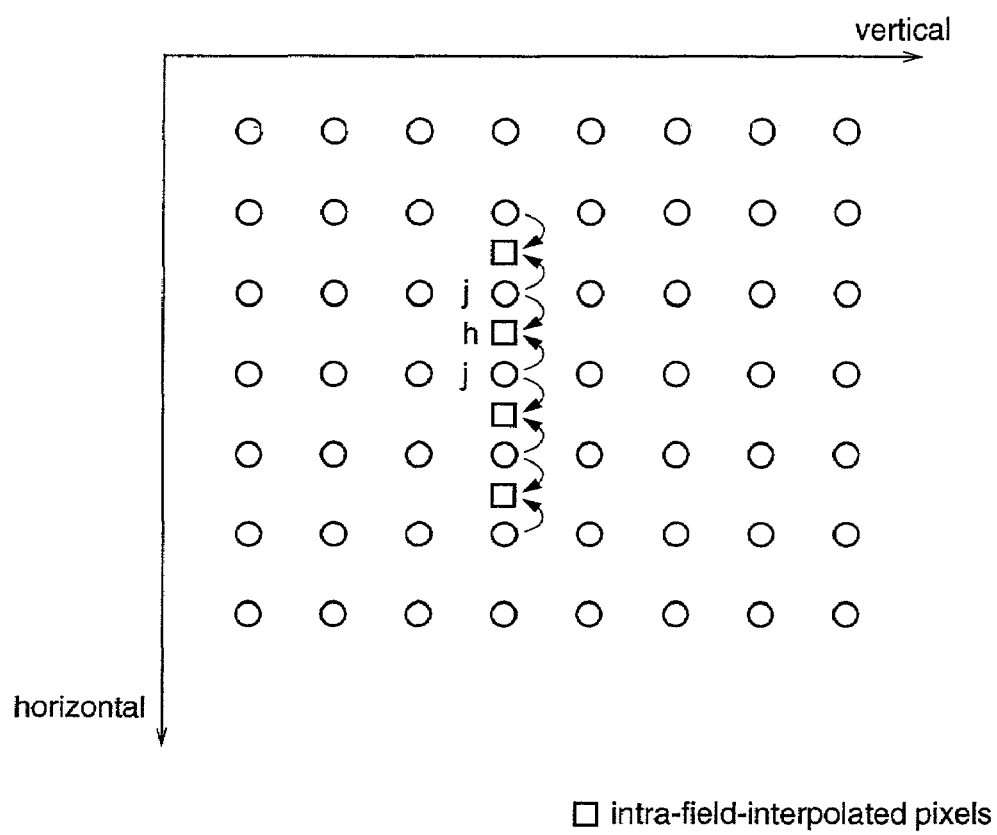
FIG. 4 is a schematic diagram for explaining progressive scanning conversion by intra-field interpolation.

Then, the progressive scanning image is converted into an interlaced scanning image having a field frequency of 60 fields/sec as shown in FIG. 3(*d*) by the frame frequency converter 103 and the interlaced scanning converter 104, and the interlaced scanning image is outputted as an output image.

In the image conversion apparatus according to the second embodiment, line frequency conversion and progressive scanning conversion are simultaneously performed on a PAL-format interlaced scanning image having a field frequency of 50 fields/sec to generate a progressive scanning image having a frame frequency of 50 frames/sec, and thereafter, frame frequency conversion and interlaced scanning conversion are performed on the progressive scanning image to generate an interlaced scanning image having a field frequency of 60 fields/sec, and the interlaced scanning image so generated is outputted as an output image. Therefore, an NTSC-format interlaced scanning image whose motion in the time direction is natural is obtained. Further, since the image conversion is realized by using a relatively simple method such as intra-field interpolation, the amount of processing is reduced, and an increase in costs is avoided. Furthermore, since the interpolation method does not vary from frame to frame, it causes no unnaturalness such that the resolution of the screen varies with time. Moreover, since line frequency conversion and progressive scanning conversion can be simultaneously carried out using the line frequency converter/progressive scanning converter 105, the image conversion apparatus can be realized at reduced costs.

[Embodiment 3]

Hereinafter, an image conversion apparatus according to a third embodiment of the present invention will be described. The description will be given of the case where an inputted PAL-format image signal is converted into an NTSC-format image signal. For simplification, it is premised that the field frequency of the NTSC system is 60 Hz.

FIG. 7(*a*) is a block diagram illustrating the construction of the image conversion apparatus according to the third embodiment.

With reference to FIG. 7(*a*), the image conversion apparatus is provided with a line frequency converter 101 for converting the line frequency of a PAL-format input image (an interlaced scanning image having a field frequency of 50 fields/sec) into the line frequency of the NTSC format; a progressive scanning converter 102 for converting the interlaced scanning image having the field frequency of 50 fields/sec, which has been subjected to the line frequency conversion, into a progressive scanning image having a frame frequency of 50 frames/sec; and a frame frequency converter 103 for converting the progressive scanning image having the frame frequency of 50 frames/sec into a progressive scanning image having a frame frequency of 60 frames/sec.

A description will be given of a PAL/NTSC conversion method using the image conversion apparatus constructed as described above. Since line frequency conversion by the line frequency converter 101 is identical to that described for the first embodiment, repeated description is not necessary. Hereinafter, image conversion method after line frequency conversion will be described with reference to FIGS. 8(*a*)–8(*d*).

FIGS. 8(*a*)–(*d*) are diagrams illustrating arrangements of fields and frames in the time direction. In these figures, solid lines indicate a first fields (an image composed of odd-numbered lines when the input image is a progressive scanning image), and dashed lines indicate a second field (an image composed of even-numbered lines when the input image is a progressive scanning image).

In the progressive scanning converter 102, an image having a field frequency of 50 fields/sec shown in FIG. 8(*a*), which has been subjected to line frequency conversion by the line frequency converter 101, is subjected to progressive scanning conversion, thereby generating an image having a frame frequency of 50 frames/sec as shown in FIG. 8(b). Although there is no conception of "field" in the progressive scanning image, the progressive scanning image shown in FIG. 8(b) is divided into fields for the sake of convenience. Further, since the progressive scanning conversion is carried out in the same manner as described for the first embodiment, repeated description is not necessary.

In the frame frequency converter 103, frame frequency conversion is performed on the progressive scanning image having the frame frequency of 50 frames/sec shown in FIG. 8(b), which has been subjected to the progressive scanning conversion by the progressive scanning converter 102. To be specific, this conversion is executed by twice repeating a frame at the rate of one frame for every five frames. Thereby, a progressive scanning image having a frame frequency of 60 frames/sec as shown in FIG. 8(c) is obtained, and the image so obtained is outputted as an output image (NTSC image).

In the image conversion apparatus according to the third embodiment, the line frequency of a PAL-format interlaced scanning image having a field frequency of 50 fields/sec is converted into the line frequency of the NTSC format and, thereafter, the interlaced scanning image is converted into a progressive scanning image having a frame frequency of 50 frames/sec and, further, the progressive scanning image is converted into a progressive scanning image having a frame frequency of 60 frames/sec by twice repeating a frame at the rate of one time for every five frames. Therefore, when performing conversion of a PAL-format interlaced scanning image to an NTSC-format progressive scanning image, an output image whose motion in the time direction is natural can be obtained. Further, the image conversion can be realized by using a relatively simple method such as intra-field interpolation, whereby the amount of processing is reduced, and an increase in costs is avoided. Moreover, since the interpolation method does not vary from frame to frame, it causes no unnaturalness such that the resolution of the screen varies with time.

While in this third embodiment the progressive scanning conversion by the progressive scanning converter 102 is carried out after performing the line frequency conversion by the line frequency converter 101, the order of these processes can be inverted with the same effects as mentioned above.

[Embodiment 4]

Hereinafter, an image conversion apparatus according to a fourth embodiment of the present invention will be described. The description will be given of a case where an inputted PAL-format image signal is converted into an NTSC-format image signal. For simplification, it is premised that the field frequency of the NTSC system is 60 Hz.

Figure 7A:
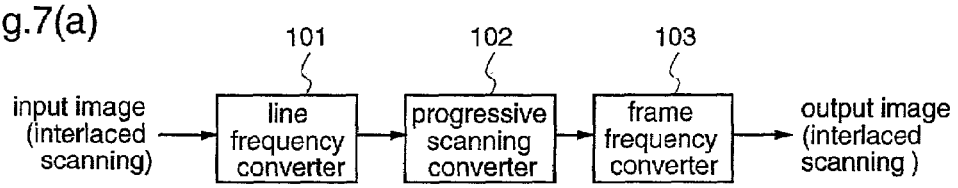
FIGS. 7(a) and 7(b) are block diagrams illustrating the constructions of image conversion apparatuses according to the third and fourth embodiments of the present invention.
Figure 7B:
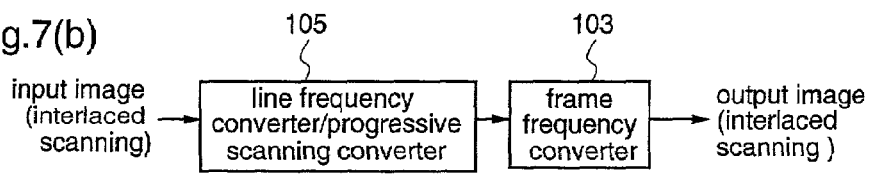

FIG. 7(b) is a block diagram illustrating the construction of an image conversion apparatus according to the fourth embodiment.

With reference to FIG. 7(b), the image conversion apparatus is provided with a line frequency converter/progressive scanning converter 105 which performs, simultaneously, line frequency conversion for converting the line frequency of a PAL-format input image (an interlaced scanning image having a field frequency of 50 fields/sec) into the line frequency of the NTSC format, and progressive scanning conversion for converting the input image into a progressive scanning image having a frame frequency of 50 frames/sec; and a frame frequency converter 103 for converting the progressive scanning image having the frame frequency of 50 frames/sec into a progressive scanning image having a frame frequency of 30 frames/sec.

A description will be given of a PAL/NTSC conversion method by the image conversion apparatus constructed as described above. Since the operation of the frame frequency converter 103 is identical to that described for the third embodiment, repeated description is not necessary.

Initially, when a PAL-format interlaced scanning image as an input image is supplied to the line frequency converter/progressive scanning converter 105, a progressive scanning image having the line frequency of the NTSC format is generated from an image corresponding to the first field of the PAL-format interlaced scanning image as shown in FIG. 5, and furthermore, a progressive scanning image having the line frequency of the NTSC format is generated from an image corresponding to the second field of the PAL-format interlaced scanning image as shown in FIG. 6. Thereby, a progressive scanning image having a frame frequency of 50 frames/sec as shown in FIG. 8(b) is obtained.

The progressive scanning image is converted into a progressive scanning image having a frame frequency of 60 frames/sec as shown in FIG. 8(c) by the frame frequency converter 103, and outputted as an output image.

In the image conversion apparatus according to the fourth embodiment, line frequency conversion and progressive scanning conversion are simultaneously performed on a PAL-format interlaced scanning image having a field frequency of 50 fields/sec to generate a progressive scanning image having a frame frequency of 50 frames/sec, and frame frequency conversion is performed on this progressive scanning image to generate a progressive scanning image having a frame frequency of 60 frames/sec. Therefore, an NTSC-format progressive scanning image whose motion in the time direction is natural can be obtained. Further, since the image conversion can be realized using a relatively simple method such as intra-field interpolation, the amount of processing is reduced, an increase in costs is avoided. Further, since the interpolation method does not vary from frame to frame, it causes no unnaturalness such as variations in resolution of the screen with time. Furthermore, since line frequency conversion and progressive scanning conversion can be simultaneously carried out using the line frequency converter/progressive scanning converter 105, an image conversion apparatus can be realized at reduced costs.

[Embodiment 5]

Hereinafter, an image conversion apparatus according to a fifth embodiment of the present invention will be described. The description will be given of a case where an inputted PAL-format image signal is converted into an NTSC-format image signal. For simplification, it is premised that the field frequency of the NTSC system is 60 Hz.

FIG. 9(a) is a block diagram illustrating the construction of an image conversion apparatus according to the fifth embodiment.

In FIG. 9(a), the image conversion apparatus is provided with a line frequency converter 101 for converting the line frequency of a PAL-format input image (an interlaced scanning image having a field frequency of 50 fields/sec) into the line frequency of the NTSC format; a progressive scanning converter 102 for converting the line-frequency-converted input image into a progressive scanning image having a frame frequency of 50 frames/sec; a frame frequency converter 103 for converting the progressive scanning image having the frame frequency of 50 frames/sec into a progressive scanning image having a frame frequency of 60 frames/sec; and an interlaced scanning converter 104 for converting the progressive scanning image having the frame frequency of 60 frames/sec into an interlaced scanning image having a frame frequency of 60 fields/sec.

As shown in FIG. 9(b), a line frequency converter/progressive scanning converter 105 may be employed instead of the line frequency converter 101 and the progressive scanning converter 102. In this case, line frequency conversion and progressive scanning conversion can be performed simultaneously, whereby the image conversion apparatus can be realized at reduced costs.

Hereinafter, a PAL/NTSC conversion method by the image conversion apparatus constructed as described above will be described with reference to FIG. 8. Since the operation of the image conversion apparatus according to this fifth embodiment is almost identical to that of the third embodiment, repeated description is not necessary.

A PAL-format interlaced scanning image having a frequency of 50 fields/sec, which is an input image, is converted into the line frequency of the NTSC format by the line frequency converter 101 as shown in FIG. 2. Thereby, an interlaced scanning image as shown in FIG. 8(a) is obtained.

The interlaced scanning image so obtained is converted into a progressive scanning image as shown in FIG. 8(b) by the progressive scanning converter 102, and the frame frequency of the progressive scanning image is converted by the frame frequency converter 103, resulting in a progressive scanning image having a frame frequency of 60 frames/sec as shown in FIG. 8(c). Thereafter, the progressive scanning image is converted into an interlaced scanning image having a frequency of 60 fields/sec as shown in FIG. 8(d) by the interlaced scanning converter 104, and the interlaced scanning image as well as the progressive scanning image obtained by the frame frequency converter 103 are outputted as output images.

In the image conversion apparatus according to the fifth embodiment, the line frequency of a PAL-format interlaced scanning image having a field frequency of 50 fields/sec is converted into the line frequency of the NTSC format, and thereafter, the line-frequency-converted image is converted into a progressive scanning image having a frame frequency of 50 frames/sec. Further, the progressive scanning image is converted into a progressive scanning image having a frame frequency of 60 frames/sec by twice repeating a frame in the ratio of one frame for every five frames, and the progressive scanning image is divided into fields to generate an interlaced scanning image having a field frequency of 60 fields/sec. Therefore, an NTSC system interlaced scanning image whose motion in the time direction is natural can be obtained. Further, since the image conversion can be realized using a relatively simple method such as intra-field interpolation, the amount of processing is reduced, and an increase in costs is avoided. Moreover, since the interpolation method does not vary from frame to frame, there occurs no such unnatural phenomenon that the resolution of the screen varies with time.

[Embodiment 6]

Hereinafter, an image conversion apparatus according to a sixth embodiment of the present invention will be described. The description will be given of a case where an inputted NTSC-format image signal is converted into a PAL-format image signal. For simplification, it is premised that the field frequency of the NTSC system is 60 Hz.

FIG. 1(a) is a block diagram illustrating the construction of an image conversion apparatus according to the sixth embodiment of the present invention.

With reference to FIG. 1(a), the image conversion apparatus is provided with a line frequency converter 101 for converting the line frequency of an NTSC-format input image (an interlaced scanning image having a field frequency of 60 fields/sec) into the line frequency of the PAL format; a progressive scanning converter 102 for converting the input image into a progressive scanning image having a frame frequency of 60 frames/sec; a frame frequency converter 103 for converting the progressive scanning image having the frame frequency of 60 frames/sec into a progressive scanning image having a frame frequency of 25 frames/sec; and an interlaced scanning converter 104 for converting the progressive scanning image having the frame frequency of 25 frames/sec into an interlaced scanning image having a field frequency of 50 fields/sec.

Hereinafter, an NTSC/PAL conversion method by the image conversion apparatus constructed as described above will be described.

Figure 10:
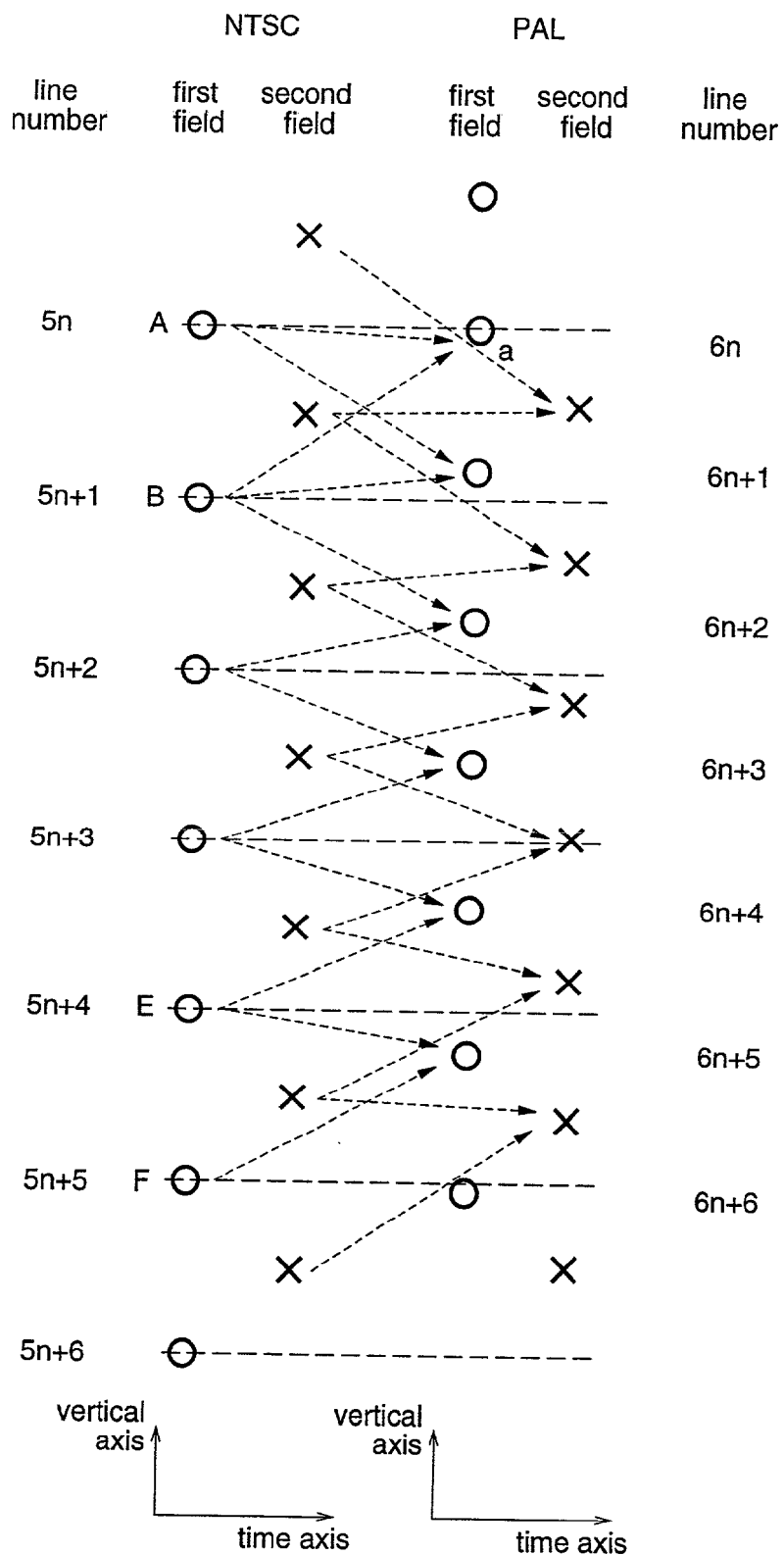
FIG. 10 is a schematic diagram for explaining line—frequency conversion by a line frequency converter which is included in the image conversion apparatus according to the sixth, eighth, or tenth embodiment of the present invention.

Initially, line frequency conversion will be described with reference to FIG. 10. FIG. 10 is a schematic diagram illustrating arrangements of scanning lines on a [vertical axis—time axis] plane on the basis of the NTSC format and the PAL format, respectively, for explaining line frequency conversion by the line frequency converter 101. In FIG. 10, white circles indicate pixels (scanning lines), and a vertical line of white circles indicates pixels which belong to the same field.

An input image is subjected to conversion from the line frequency of the NTSC format to the line frequency of the PAL format by the line frequency converter 101 using an interpolation filter. In FIG. 10, for example, when performing interpolation in the vertical direction in field units using a two-tap linear interpolation filter, a pixel at the end of an arrow is generated from a pixel at the beginning of the arrow, and a pixel "a" is generated by filtering a pixel "A" and a pixel "B". While in this sixth embodiment line frequency conversion is carried out using a 2-tap linear interpolation filter, it may be carried out using a filter having a different number of taps, or a different method.

Figure 13:
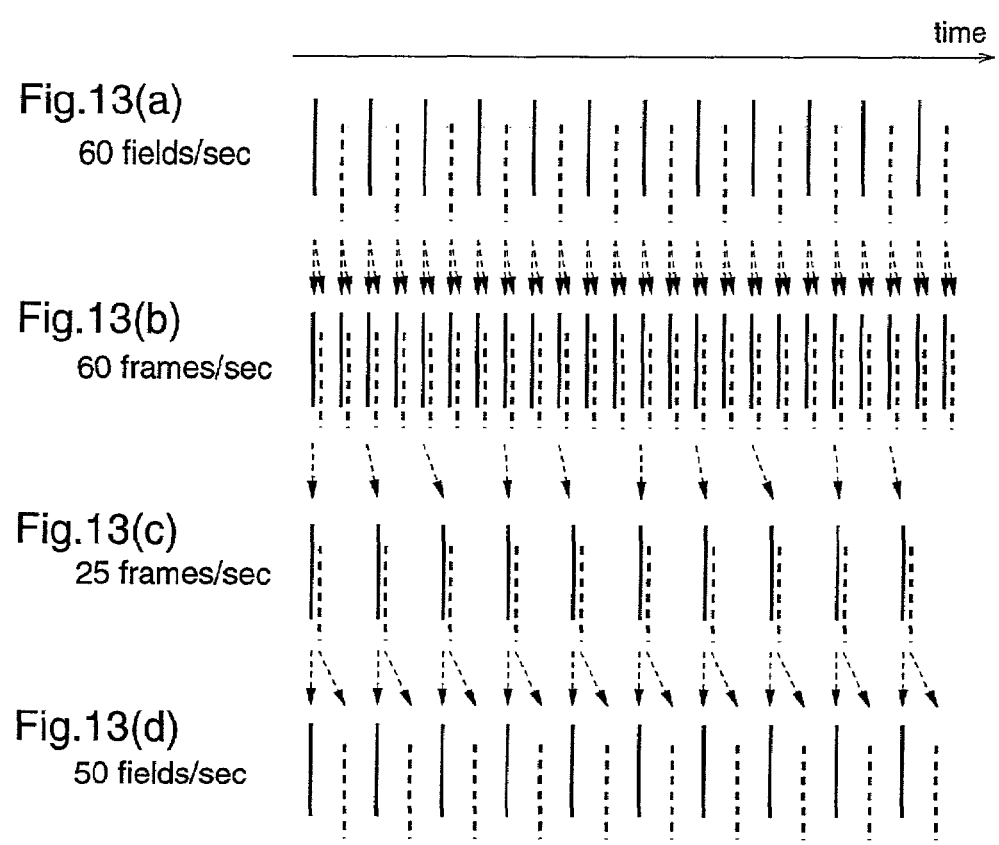
FIGS. 13(a)–13(d) are schematic diagrams for explaining image conversion methods according to the sixth and seventh embodiments of the present invention.
Figure 14:
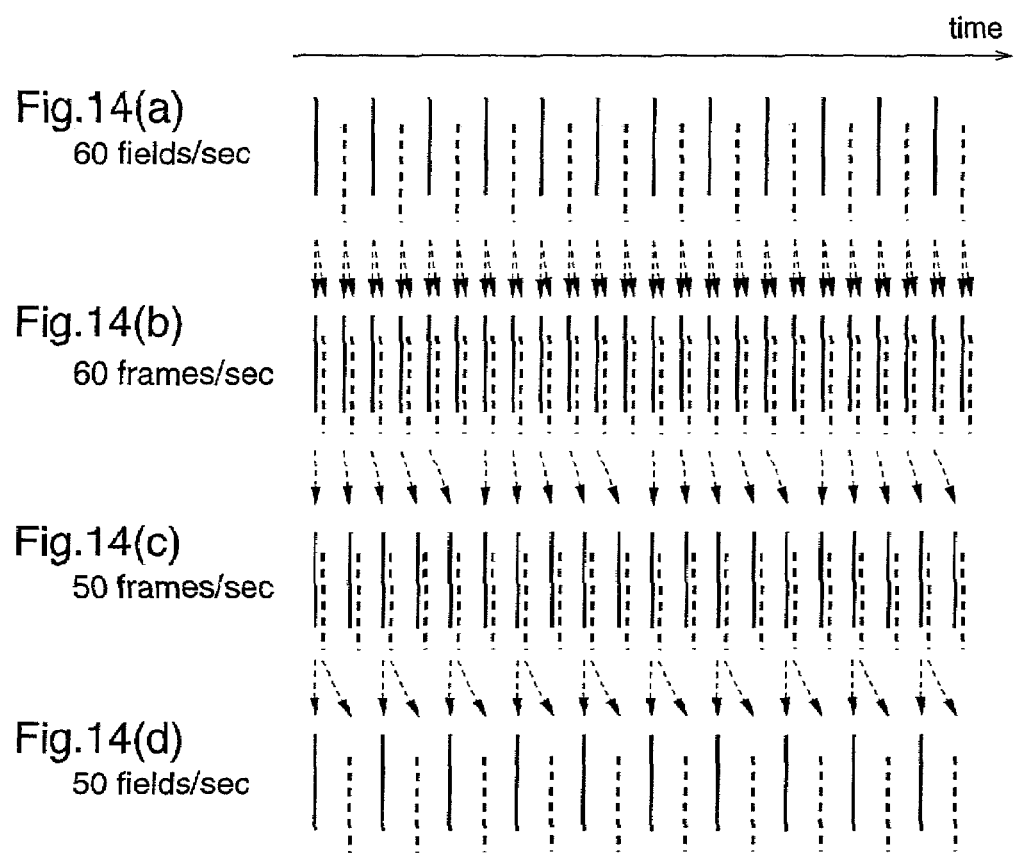
FIGS. 14(a)–14(d) are schematic diagrams for explaining image conversion methods according to the eighth, ninth, and tenth embodiments of the present invention.

As described above, in the line frequency converter 101, the number of pixels (line frequency) in the vertical direction of each field of the NTSC-format input image is converted into the line frequency of the PAL format as shown in FIG. 13(a). In the case of digital image data, one frame is composed of vertical 720 pixels and horizontal 486 (or 480) pixels in the NTSC format, while one frame is composed of horizontal 720 pixels and vertical 576 pixels in the PAL format, and therefore, line frequency conversion from the NTSC format to the PAL format can be realized by generating pixels equivalent to six lines of the NTSC format from pixels equivalent to five lines of the NTSC format.

Next, an image conversion method after the line frequency conversion will be described with reference to FIGS. 13(a)–13(d). FIGS. 13(a)–13(d) are schematic diagrams illustrating arrangements of fields and frames in the time direction. In FIGS. 13(a)–13(d), solid lines indicate a first field (an image constituted by odd-numbered lines when the input image is a progressive scanning image), and dashed lines indicate a second field (an image constituted by even-numbered lines when the input image is a progressive scanning image).

The progressive scanning converter 102 performs progressive scanning conversion on the interlaced scanning image having a field frequency of 60 fields/sec as shown in FIG. 13(a), which image has been subjected to line frequency conversion by the line frequency converter 101, thereby generating a progressive scanning image having a frame frequency of 60 frames/sec as shown in FIG. 13(b). Although there is no conception of "field" in the progressive scanning image, the progressive scanning image is divided into fields in FIG. 13(b) for the sake of convenience. Since the method of progressive scanning conversion according to this sixth embodiment is identical to that described for the first embodiment, repeated description is not necessary.

Next, in the frame frequency converter 103, frame frequency conversion is performed on the progressive scanning image having a frame frequency of 60 frames/sec as shown in FIG. 13(b), which image has been subjected to progressive scanning conversion by the progressive scanning converter 102. This conversion is carried out by removing seven frames out of every twelve frames. Thereby, a progressive scanning image having a frame frequency of 25 frames/sec is generated as shown in FIG. 13(c).

Next, in the interlaced scanning converter 104, the progressive scanning image, the frame frequency of which has been converted to 25 frames/sec by the frame frequency converter 103, is converted into an interlaced scanning image. To be specific, the progressive scanning image having the frame frequency of 25 frames/sec shown in FIG. 13(c) is divided into a first field which is composed of the odd-numbered lines and a second field which is composed of the even-numbered lines, thereby obtaining an interlaced scanning image having a field frequency of 50 fields/sec as shown in FIG. 13(d). The interlaced scanning image thus obtained is outputted as a PAL image.

While the above description is given of the case where the input image is an NTSC-format image having a field frequency of 60 fields/sec, an image conversion method for converting an image which is compressed by MPEG or the like will be described hereinafter with reference to FIGS. 15(a)–15(d).

It is assumed that the input image is an image which is compressively coded by MPEG or the like as shown in FIG. 15(a). The picture type at this time is as shown in FIG. 15(a).

Figure 15:
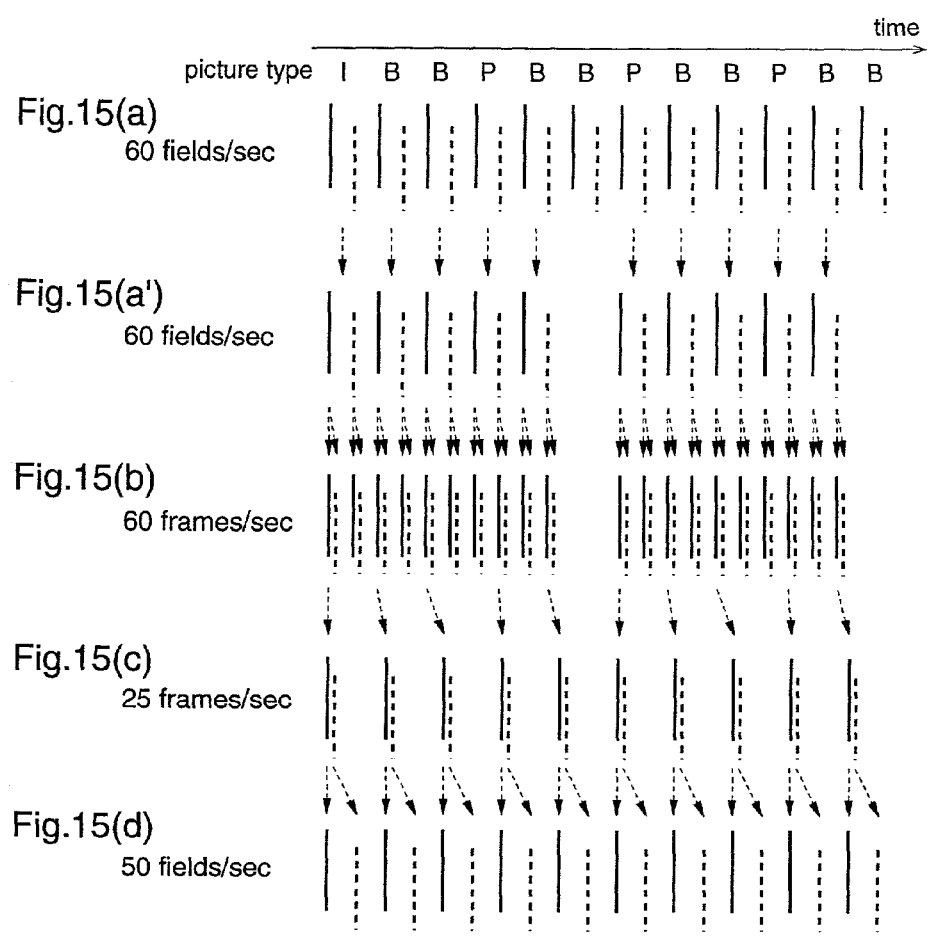
FIG. 15 is a schematic diagram for explaining an image conversion method in the case where an input image is compressed by MPEG, according to the sixth embodiment of the present invention.

When decoding the input image compressed by MPEG or the like, decoding of B-picture-coded frames (i.e., frames coded by bidirectional predictive coding) are skipped at a rate of one frame for every six frames, thereby obtaining an interlaced scanning image having a field frequency of 60 fields/sec as shown in FIG. 15(a'). Then, the interface scanning image is converted into a progressive scanning image having a frame frequency of 60 frames/sec as shown in FIG. 15(b) and, thereafter, converted into a progressive scanning image having a frame frequency of 25 frames/sec as shown in FIG. 15(c). Then, the progressive scanning image is subjected to interlaced scanning conversion to generate an interlaced scanning image having a field frequency of 50 fields/sec as shown in FIG. 15(c), and finally, the interlaced scanning image is outputted as a PAL image.

In the image conversion apparatus according to the sixth embodiment, the line frequency of an NTSC-format interlaced scanning image having a field frequency of 60 fields/sec is converted into the line frequency of the PAL format, and thereafter, the line-frequency-converted image is converted into a progressive scanning image having a frame frequency of 60 frames/sec. Then, the progressive scanning image is converted into a progressive scanning image having a frame frequency of 25 frames/sec by thinning the frames uniformly with respect to time. Then, the progressive scanning image is divided into fields to generate an interlaced scanning image having a field frequency of 50 fields/sec, and the generated interlaced scanning image is outputted as an output image. Therefore, a PAL-format interlaced scanning image whose motion in the time direction is natural can be obtained. Further, since the image conversion can be realized using a relatively simple method such as intra-field interpolation, the amount of processing is reduced, and an increase in costs is avoided. Furthermore, since the interpolation method does not vary from frame to frame, there occurs no unnaturalness such that the resolution of the screen varies with time.

While in this sixth embodiment the progressive scanning conversion by the progressive scanning converter 102 is carried out after performing the line frequency conversion by the line frequency converter 101, the order of these processes may be inverted with the same effects as described above.

[Embodiment 7]

Hereinafter, an image conversion apparatus according to a seventh embodiment of the present invention will be described. The description will be given of a case where an inputted NTSC-format image signal is converted into a PAL-format image signal.

FIG. 1(b) is a block diagram illustrating the construction of an image conversion apparatus according to the seventh embodiment.

With reference to FIG. 1(b), the image conversion apparatus is provided with a line frequency converter/progressive scanning converter 105 which performs, simultaneously, line frequency conversion for converting the line frequency of an NTSC-format input image (interlaced scanning image having a field frequency of 60 fields/sec) into the line frequency of the PAL format, and progressive scanning conversion for converting the input image into a progressive scanning image having a frame frequency of 60 frames/sec; a frame frequency converter 103 for converting the progressive scanning image having the frame frequency of 60 frames/sec into a progressive scanning image having a frame frequency of 25 frames/sec; and an interlaced scanning converter 104 for converting the progressive scanning image having the frame frequency of 25 frames/sec into an interlaced scanning image having a field frequency of 50 fields/sec.

A description will be given of an NTSC/PAL conversion method using the image conversion apparatus constructed as described above. Since the operations of the frame frequency converter 103 and the interlaced scanning converter 104 are identical to those described for the sixth embodiment, repeated description is not necessary. Hereinafter, the operation of the line frequency converter/progressive scanning converter 105 will be described.

Figure 11:
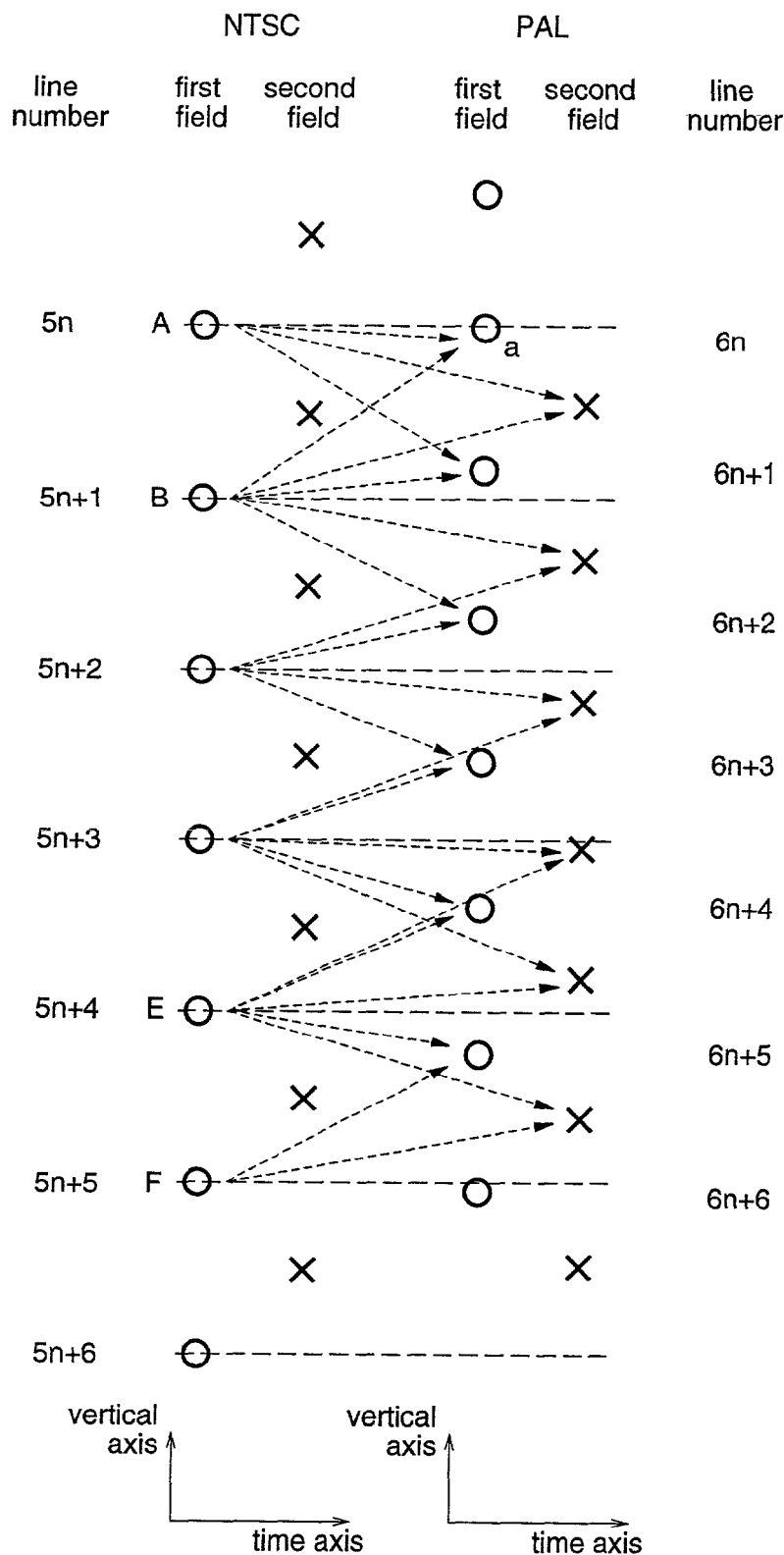
FIG. 11 is a schematic diagram for explaining the operation of a line frequency converter/progressive scanning converter which is included in the image conversion apparatus according to the seventh or ninth embodiment of the present invention.
Figure 12:
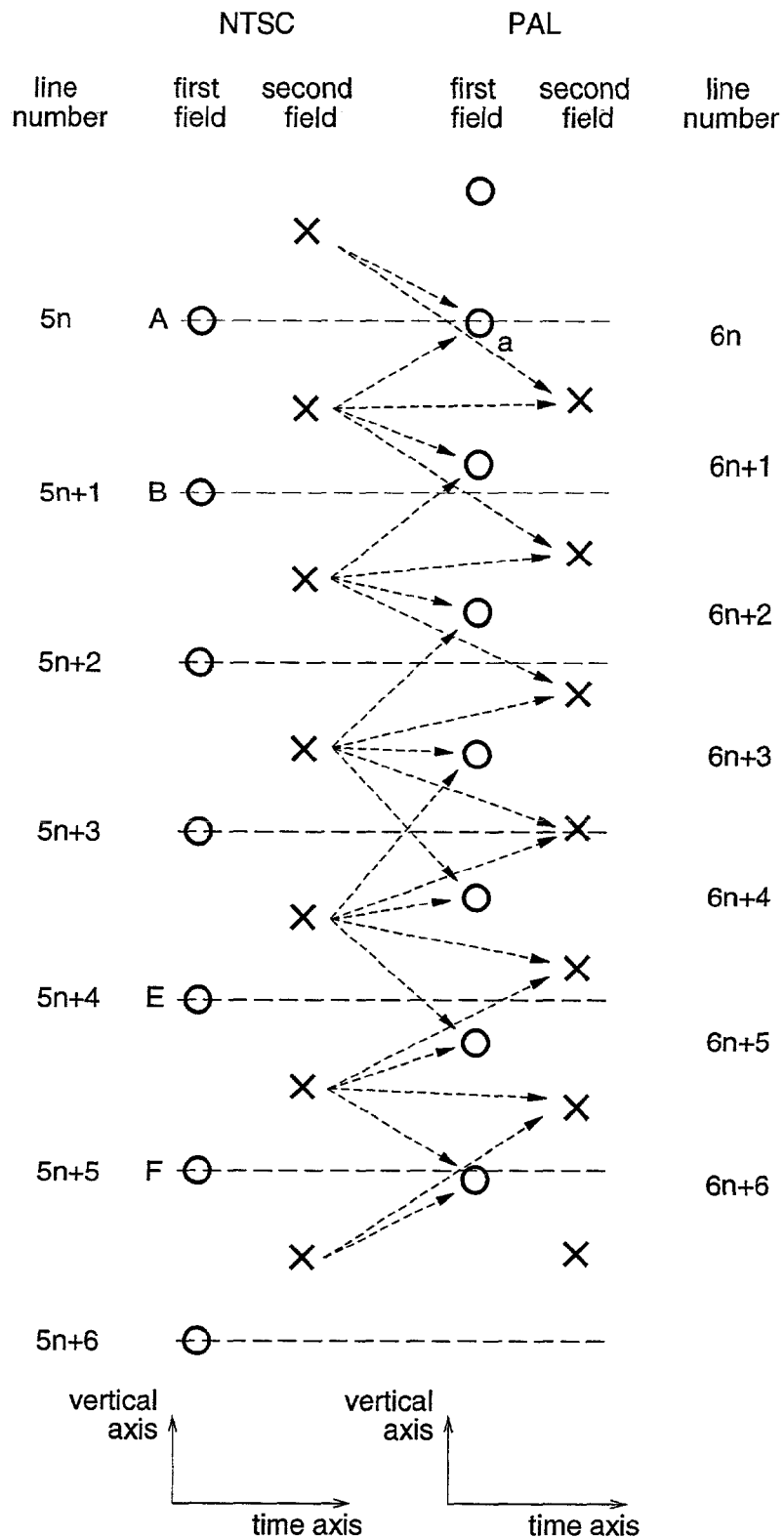
FIG. 12 is a schematic diagram for explaining the operation of the line frequency converter/progressive scanning converter included in the image conversion apparatus according to the seventh or ninth embodiment of the present invention.

Initially, in the line frequency converter/progressive scanning converter 105, as shown in FIG. 11, a progressive scanning image having the line frequency of the NTSC format is generated from an image corresponding to the first field of a PAL-format interlaced scanning image which is an input image, and furthermore, as shown in FIG. 12, a progressive scanning image having the line frequency of the NTSC format is generated from an image corresponding to the second field of the PAL-format interlaced scanning image. Thereby, a progressive scanning image having a frame frequency of 60 frames/sec shown in FIG. 13(b) is obtained.

Then, the progressive scanning image is converted into an interlaced scanning image having a field frequency of 50 fields/sec as shown in FIG. 13(d) by the frame frequency converter 103 and the interlaced scanning converter 104, and the interlaced scanning image so obtained is outputted as an output image.

In the image conversion apparatus according to the seventh embodiment, line frequency conversion and progressive scanning conversion are simultaneously performed on an NTSC-format interlaced scanning image having a field frequency of 60 fields/sec to generate a progressive scanning image having a frame frequency of 60 frames/sec, and thereafter, frame frequency conversion and interlaced scanning conversion are performed on the progressive scanning image to generate an interlaced scanning image having a field frequency of 50 fields/sec, and the interlaced scanning image so generated is outputted as an output image. Therefore, a PAL-format interlaced scanning image whose motion in the time direction is natural can be obtained. Further, since the image conversion is realized by using a relatively simple method such as intra-field interpolation, the amount of processing is reduced, resulting in no increase in costs. Furthermore, since the interpolation method does not vary from frame to frame, there occurs no unnaturalness such that the resolution of the screen varies with time. Moreover, since the line frequency conversion and the progressive scanning conversion can be simultaneously carried out using the line frequency converter/progressive scanning converter 105, the image conversion apparatus can be implemented at reduced costs.

[Embodiment 8]

Hereinafter, an image conversion apparatus according to an eight embodiment of the present invention will be described. The description will be given of a case where an inputted NTSC-format image signal is converted into a PAL-format image signal. For simplification, it is premised that the field frequency of the NTSC format is 60 Hz.

FIG. 7(a) is a block diagram illustrating the construction of an image conversion apparatus according to the eighth embodiment.

With reference to FIG. 7(a), the image conversion apparatus is provided with a line frequency converter 101 for converting the line frequency of an NTSC-format input image (an interlaced scanning image having a field frequency of 60 fields/sec) into the line frequency of the PAL format; a progressive scanning converter 102 for converting the interlaced scanning image having a field frequency of 50 fields/sec, which has been subjected to the line frequency conversion, into a progressive scanning image having a frame frequency of 50 frames/sec; and a frame frequency converter 103 for converting the progressive scanning image having the frame frequency of 50 frames/sec into a progressive scanning image having a frame frequency of 60 frames/sec.

A description will be given of an NTSC/PAL conversion method using the image conversion apparatus constructed as described above. Since the line frequency conversion by the line frequency converter 101 is identical to that described for the seventh embodiment, repeated description is not necessary. Hereinafter, the image conversion method after the line frequency conversion will be described with reference to FIGS. 14(a)–14(d).

FIGS. 14(a)–14(d) are diagrams illustrating arrangements of fields and frames in the time direction. In these figures, solid lines indicate a first field (in the case of a progressive scanning image, an image composed of odd-numbered lines), and dashed lines indicate a second field (in the case of a progressive scanning image, an image composed of even-numbered lines).

In the progressive scanning converter 102, progressive scanning conversion is performed on the image having a field frequency of 60 fields/sec shown in FIG. 14(a), which has been subjected to the line frequency conversion by the line frequency converter 101, thereby generating an image having a frame frequency of 60 frames/sec as shown in FIG. 14(b). Although there is no conception of "field" in the progressive scanning image, in FIG. 14(b) the progressive scanning image is divided into fields for the sake of convenience. Further, since the method of the progressive scanning conversion according to this eighth embodiment is identical to that described for the first embodiment, repeated description is not necessary.

In the frame frequency converter 103, frame frequency conversion is performed on the image which has been subjected to the progressive scanning conversion by the progressive scanning converter 102. That is, this conversion is executed by removing thinning the frames at the rate of one frame out of every six frames. Thereby, a progressive scanning image having a frame frequency of 60 frames/sec is obtained as shown in FIG. 14(c), and outputted as a PAL image. In this eighth embodiment, the progressive scanning image having a frame frequency of 50 frames/sec is obtained by thinning the frames of the progressive scanning image having a frame frequency of 60 frames/sec by the frame frequency converter 103. However, when a progressive scanning image having a frame frequency of 60 frames/sec is repeated in frame units such that three frames are increased to five frames, a progressive scanning image having a frame frequency of 100 frames/sec can be obtained as an output image.

In the image conversion apparatus according to the eighth embodiment, the line frequency of an NTSC-format interlaced scanning image having a field frequency of 60 fields/sec is converted into the line frequency of the PAL format and, thereafter, the line-frequency-converted image is converted into a progressive scanning image having a frame frequency of 60 frames/sec and, further, the progressive scanning image is converted into a progressive scanning image having a frame frequency of 50 frames/sec by thinning the frames at the rate of one frame out of every six frames. Therefore, when performing conversion from an NTSC-format interlaced scanning image to a PAL-format progressive scanning image, an output image whose motion in the time direction is natural can be obtained. Further, since the image conversion is realized using a relatively simple method such as an intra-field interpolation, the amount of processing is reduced, resulting in no increase in costs. Furthermore, since the interpolation method does not vary from frame to frame, there occurs no unnaturalness such that the resolution of the screen varies with time.

Furthermore, while in this eighth embodiment the progressive scanning conversion by the progressive scanning converter 102 is carried out after the line frequency conversion by the line frequency converter 101, the order of these processed may be inverted with the same effects as described above.

[Embodiment 9]

Hereinafter, an image conversion apparatus according to a ninth embodiment of the present invention will be described. The description will be given of a case where an inputted NTSC-format image signal is converted into a PAL-format image signal. For simplification, it is premised that the field frequency of the NTSC format is 60 Hz.

FIG. 7(b) is a block diagram illustrating the construction of an image conversion apparatus according to the ninth embodiment.

With reference to FIG. 7(b), the image conversion apparatus is provided with a line frequency converter/progressive scanning converter 105 which performs, simultaneously, line frequency conversion for converting the line frequency of an NTSC-format input image (an interlaced scanning image having a field frequency of 60 fields/sec) into the line frequency of the PAL format, and progressive scanning conversion for converting the input image into a progressive scanning image having a frame frequency of 50 frames/sec; and a frame frequency converter 103 for converting the progressive scanning image having the frame frequency of 50 frames/sec into a progressive scanning image having a frame frequency of 60 frames/sec.

A description will be given of an NTSC/PAL conversion method using the image conversion apparatus constructed as described above. Since the operation of the frame frequency converter 103 is identical to that described for the eighth embodiment, repeated description is not necessary.

Initially, in the line frequency converter/progressive scanning converter 105, as shown in FIG. 11, a progressive scanning image having the line frequency of the NTSC format is generated from an image corresponding to the first field of a PAL-format interlaced scanning image which is an input image, and furthermore, as shown in FIG. 12, a progressive scanning image having the line frequency of the NTSC format is generated from an image corresponding to the second field of the PAL-format interlaced scanning image. Thereby, a progressive scanning image having a frame frequency of 60 frames/sec shown in FIG. 14(b) is obtained.

The progressive scanning image is converted into a progressive scanning image having a frame frequency of 50 frames/sec as shown in FIG. 14(c) by the frame frequency converter 103, and outputted as an output image.

In the image conversion apparatus according to the ninth embodiment, line frequency conversion and progressive scanning conversion are simultaneously performed on an NTSC-format interlaced scanning image having a field frequency of 60 fields/sec to generate a progressive scanning image having a frame frequency of 60 frames/sec, and thereafter, frame frequency conversion is performed on this progressive scanning image to generate a progressive scanning image having a frame frequency of 50 frames/sec. Therefore, an NTSC-format progressive scanning image whose motion in the time direction is natural can be obtained. Further, since the image conversion can be realized using a relatively simple method such as intra-field interpolation, the amount of processing is reduced, resulting in no increase in costs. Further, since the interpolation method does not vary from frame to frame, there occurs no such unnaturalness that the resolution of the screen varies with time. Furthermore, since line frequency conversion and progressive scanning conversion can be simultaneously carried out using the line frequency converter/progressive scanning converter 105, the image conversion apparatus can be realized at reduced costs.

[Embodiment 10]

Hereinafter, an image conversion apparatus according to a tenth embodiment of the present invention will be described. The description will be given of a case where an inputted NTSC-format image signal is converted into a PAL-format image signal. For simplification, it is premised that the field frequency of the NTSC format is 60 Hz.

FIG. 9(a) is a block diagram illustrating the construction of the image conversion apparatus according to the tenth embodiment.

With reference to FIG. 9(a), the image conversion apparatus is provided with a line frequency converter 101 for converting the line frequency of an NTSC-format input image (an interlaced scanning image having a field frequency of 60 fields/sec) into the line frequency of the PAL format; a progressive scanning conversion 102 for converting the line-frequency-converted image into a progressive scanning image having a frame frequency of 50 frames/sec; a frame frequency converter 103 for converting the progressive scanning image having the frame frequency of 50 frames/sec into a progressive scanning image having a frame frequency of 60 frames/sec; and an interlaced scanning converter 104 for converting the progressive scanning image having the frame frequency of 50 frames/sec into an interlaced scanning image having a frame frequency of 50 fields/sec.

When a line frequency converter/progressive scanning converter 105 is employed instead of the line frequency converter 101 and the progressive scanning converter 102 as shown in FIG. 9(b), line frequency conversion and progressive scanning conversion can be performed simultaneously, resulting in an image conversion apparatus at reduced costs.

Hereinafter, an NTSC/PAL conversion method using the image conversion apparatus constructed as described above will be described with reference to FIG. 14. Since the operation of the image conversion apparatus according to this tenth embodiment is almost identical to that of the eighth embodiment, repeated description is not necessary.

An NTSC-format interlaced scanning image having a field frequency of 60 fields/sec as an input image is converted into an image having the line frequency of the PAL format by the line frequency converter 101 as shown in FIG. 10. Thereby, an interlaced scanning image as shown in FIG. 14(a) is obtained.

The interlaced scanning image so obtained is converted into a progressive scanning image as shown in FIG. 14(b) by the progressive scanning converter 102, and the frame frequency of the progressive scanning image is converted by the frame frequency converter 103, resulting in a progressive scanning image having a frame frequency of 50 frames/sec as shown in FIG. 14(c). Thereafter, the progressive scanning image is converted into an interlaced scanning image having a frequency of 50 fields/sec as shown in FIG. 14(d) by the interlaced scanning converter 104, and the interlaced scanning image so obtained and the progressive scanning image obtained by the frame frequency converter 103 are outputted as output images.

In the image conversion apparatus according to the tenth embodiment, the line frequency of an NTSC-format interlaced scanning image having a field frequency of 60 fields/sec is converted into the line frequency of the PAL format, and thereafter, the line-frequency-converted image is converted into a progressive scanning image having a frame frequency of 60 frames/sec. Then, the progressive scanning image is converted into a progressive scanning image having a frame frequency of 50 frames/sec by thinning the frames at the rate of one frame out of every six frames. Then, the progressive scanning image is divided into fields to generate an interlaced scanning image having a field frequency of 50 fields/sec, and thereafter, the progressive scanning image having a frame frequency of 50 frames/sec and the interlaced scanning image having a field frequency of 50 fields/sec are simultaneously outputted. Therefore, an NTSC-format interlaced scanning image whose motion in the time direction is natural can be obtained. Further, since the image conversion can be realized using a relatively simple method such as intra-field interpolation, the amount of processing is reduced, resulting in no increase in costs. Moreover, since the interpolation method does not vary from frame to frame, there occurs no such unnaturalness that the resolution of the screen varies with time.

[Embodiment 11]

Hereinafter, an image conversion method and an image conversion apparatus according to an eleventh embodiment of the present invention will be described. While in this eleventh embodiment an input image is switched between the NTSC format and the PAL format, it may be switched between the NTSC-format or the PAL format and the SECAM format, or between formats of different screen sizes.

Figure 16:
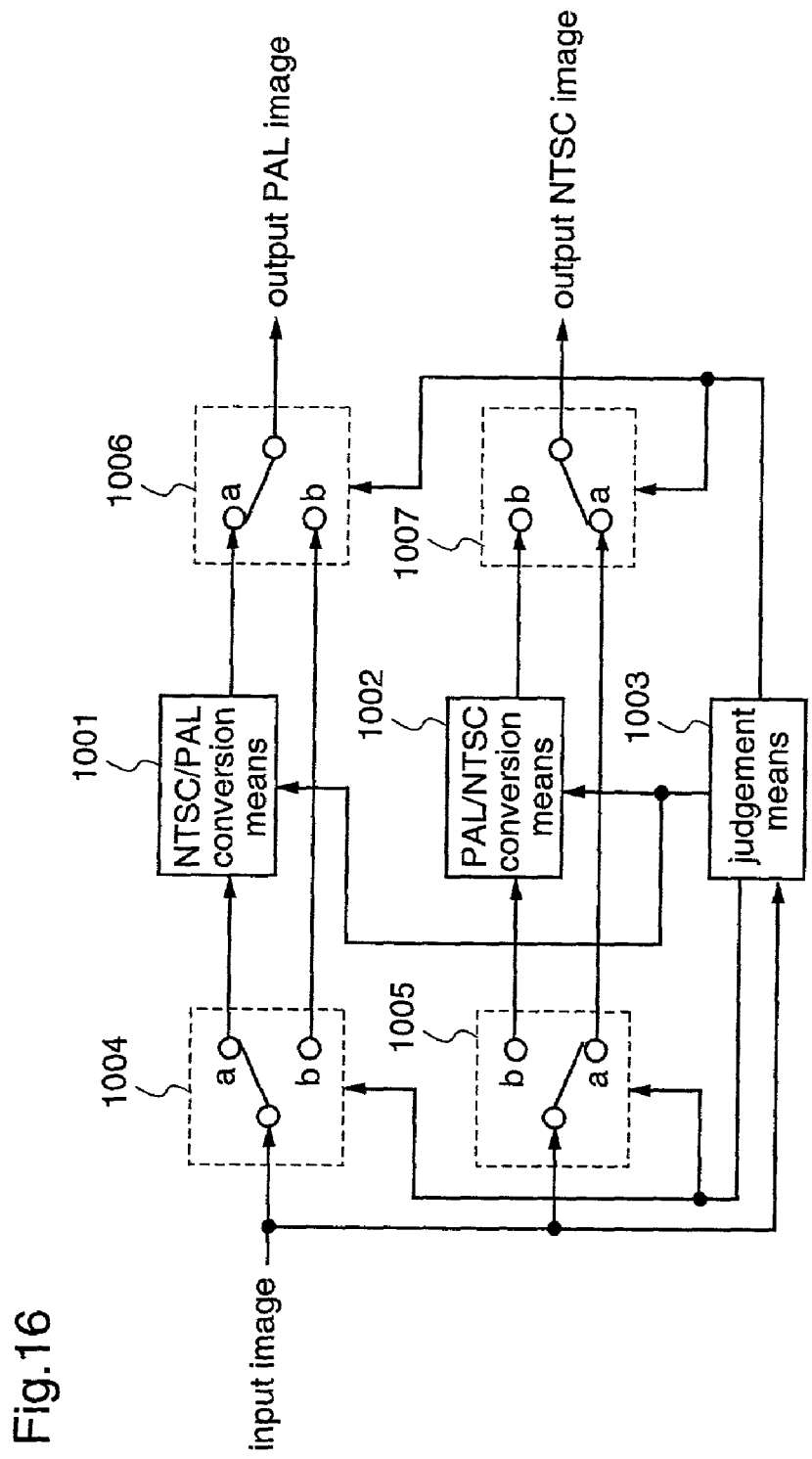
FIG. 16 is a block diagram for explaining an image conversion apparatus according to an eleventh embodiment of the present invention.

FIG. 16 is a block diagram illustrating the construction of an image conversion apparatus according to the eleventh embodiment of the present invention.

With reference to FIG. 16, the image conversion apparatus is provided with an NTSC/PAL conversion means 1001 for converting an NTSC-format image signal into a PAL-format image signal; a PAL/NTSC conversion means 1002 for converting a PAL-format image signal into an NTSC-format image signal; and a judgement means 1003 for judging whether the input image is an NTSC-format image signal or a PAL-format image signal, and controlling switches 1004~1007 on the basis of the judgement result. In this eleventh embodiment, the image conversion method described for the first embodiment is employed as an NTSC/PAL conversion method, and the image conversion method described for the sixth embodiment is employed as a PAL/NTSC conversion method. However, the image conversion method described for any of the second to fifth embodiments may be employed as an NTSC/PAL conversion method, and the PAL/NTSC image conversion method described for any of the seventh to tenth embodiments may be employed as a PAL/NTSC conversion method.

Hereinafter, the operation of the image conversion method constructed as above will be described.

Initially, the judgement means 1003 judges whether an input image is an NTSC-format image signal or a PAL-format image signal, and outputs a signal indicating the result of the judgement to the NTSC/PAL conversion means 1001, the PAL/NTSC conversion means 1002, and the switches 1004~1007, respectively. This judgement is carried out on the basis of, for example, the size of each frame of the image signal, the frame frequency, and the like.

When the judgement means 1003 judges that the input image is an NTSC-format image, all of the switches 1004~1007 select terminals "a". Thereby, the input image is inputted to the NTSC/PAL conversion means 1001. Then, the NTSC/PAL conversion means 1001 converts the inputted NTSC-format image signal into a PAL-format image signal. The image signal converted into the PAL format is outputted through the switch 1006. On the other hand, the image signal inputted to the switch 1005 is outputted as it is through the switch 1007. In this case, the PAL/NTSC conversion means 1002 is not operated.

Further, when the judgement means 1003 judges that the input image is a PAL-format image, all of the switches 1004~1007 select terminals "b". Thereby, the input image is inputted to the PAL/NTSC conversion means 1002. Then, the PAL/NTSC conversion means 1002 converts the inputted PAL-format image signal into an NTSC-format image signal. The image signal converted into the NTSC format is outputted through the switch 1007. On the other hand, the image signal inputted to the switch 1004 is outputted as it is through the switch 1006. In this case, the NTSC/PAL conversion means is not operated.

In the image conversion apparatus according to the eleventh embodiment, it is judged whether the input image is an NTSC-format image signal or a PAL-format image signal, and an inputted NTSC-format image signal is converted into the PAL format while an inputted PAL-format image signal is converted into the NTSC format according to the result of the judgement. Therefore, the format of the input image can be judged automatically, whereby an NTSC-format image signal and a PAL-format image signal can be obtained simultaneously.

In the eleventh embodiment of the invention, an NTSC-format image and a PAL-format image are simultaneously obtained by controlling the switches 1004~1007 according to the format of the input image. However, conversion of the input image may be carried out by operating either the NTSC/PAL conversion means 1001 or the PAL/NTSC conversion means 1002 according to the format of the input image without using the switches 1004~1007, whereby either an NTSC-format image or a PAL-format image can be obtained.

Furthermore, in the eleventh embodiment of the invention, conversion of the input image is carried out using the NTSC/PAL conversion means 1001 and the PAL/NTSC conversion means 1002. However, conversion of the input image may be carried out using an image conversion means which performs either NTSC/PAL conversion or PAL/NTSC conversion according to the format of the input image, whereby the image conversion apparatus can be implemented at reduced costs.

[Embodiment 12]

Hereinafter, an image conversion method and an image conversion apparatus according to a twelfth embodiment of the present invention will be described with reference to FIG. 17.

In the image conversion apparatus according to the twelfth embodiment, the image format of an input image is determined, and when the input image is a PAL-format image signal, the PAL-format image signal is converted into an NTSC-format image signal using the image conversion method according to the first or second embodiment. On the other hand, when the input image is an NTSC-format image signal, the input image is outputted as it is.

Figure 17:
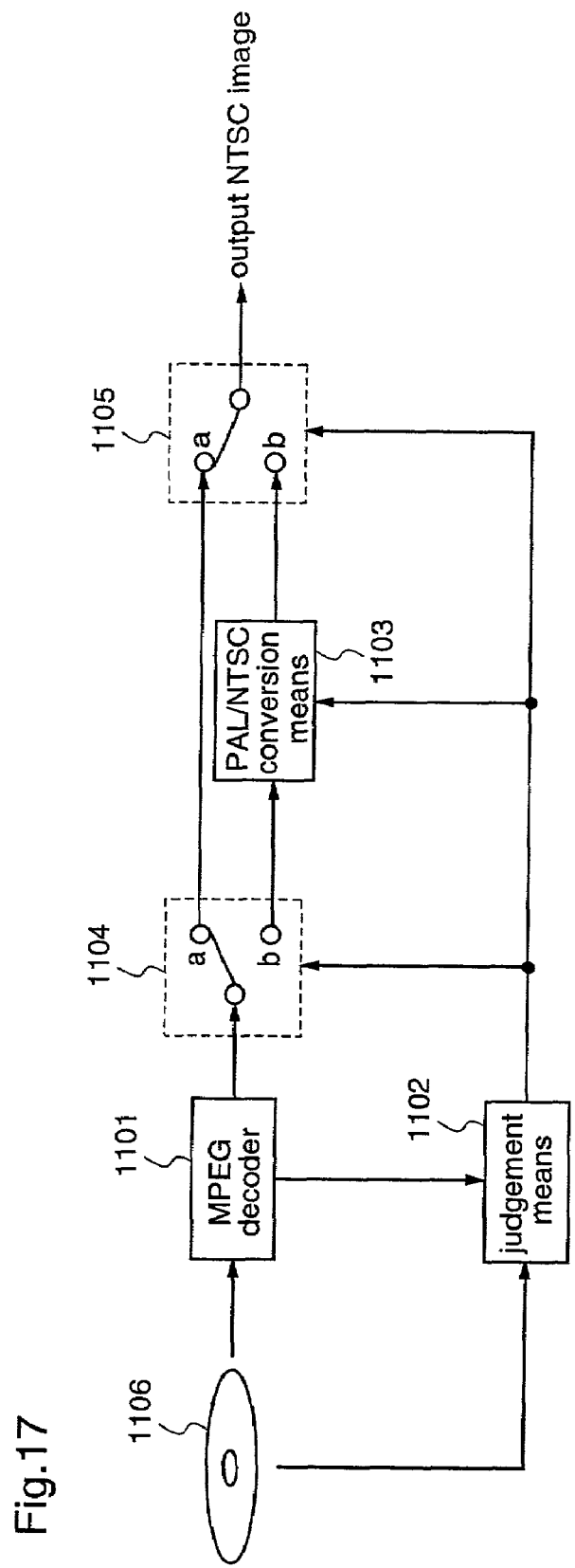
FIG. 17 is a block diagram for explaining an image conversion apparatus according to a twelfth embodiment of the present invention.

FIG. 17 is a block diagram illustrating the construction of the image conversion apparatus according to the twelfth embodiment.

In FIG. 17, the image conversion apparatus according to the twelfth embodiment is provided with an MPEG decoder 1101 for decoding coded data; a judgement means 1102 for judging the format of an input image, and selecting either a switch 1104 or a switch 1105 according to the result of the judgement; and a PAL/NTSC conversion means 1103 for converting a PAL-format image into an NTSC-format image. This twelfth embodiment employs the PAL/NTSC image conversion method according to any of the first to fifth embodiments.

Next, the operation of the image conversion apparatus constructed as described above will be described. It is assumed that data obtained by MPEG-coding a PAL-format image is recorded on a recording medium 1106, and the data is to be reproduced. Although the image data recorded on the recording medium 1106 is coded by MPEG coding, the coding method is not restricted thereto.

Initially, management information of the coded data recorded on the recording medium 1106 is reproduced, and the management information is inputted to the judgement means 1102. The judgement means 1102 checks the image format of the coded data, on the basis of the management information. For example, when the recording medium 1106 is a DVD-Video disk, since video title set information (VTSI) includes a flag indicating whether coded data is NTSC-format data or PAL-format data, the format of the coded data can be judged according to the flag.

The coded data reproduced from the recording medium 1106 is inputted to the MPEG decoder 1101. The MPEG decoder 1101 decodes the coded data, and outputs the decoded data as an image signal to the switched 1104.

When decoding the coded data, the image format of the coded data can be known from information about the frame size of the image included in the coded data. For example, when the data is coded by MPEG, information about the frame size, which is included in a sequence header, can be used. This information is inputted to the judgement means 1102. The judgement means 1102 judges, from the management information, whether the image of the coded data is in the NTSC format or in the PAL format. Although the image format of the image data is judged using the management information reproduced from the recording medium 1106 and the frame size information outputted from the MPEG decoder 1101, it may be judged using either the management information or the frame size information.

The result of the judgement by the judgement means 1102 is outputted to the PAL/NTSC conversion means 1103 and to the switches 1104 and 1105.

When judgement means 1102 judges that the image of the coded data is in the NTSC format, both of the switches 1104 and 1105 are connected to terminals "a". Thereby, the decoded image signal is outputted as it is through the switches 1104 and 1105. In this case, the PAL/NTSC conversion means 1103 is not operated.

Further, when the judgement means 1102 judges that the image of the coded data is in the PAL format, both of the switches 1104 and 1105 are connected to terminals "b". Thereby, the decoded image signal is inputted to the PAL/NTSC conversion means 1103. The PAL/NTSC conversion means 1103 converts the inputted PAL-format image signal into the NTSC format. The image signal converted into the NTSC format is outputted through the switch 1105.

In the image conversion apparatus according to the twelfth embodiment, when the coded image data reproduced from the recording medium 1106 is decoded to obtain an image signal, the image format (NTSC format or PAL format) of the coded image data is judged on the basis of the management information of the coded image data which is recorded in the recording medium 1106, the header information included in the coded image data, and the like. When it is judged that the coded image data is a PAL-format image signal, it is converted into an NTSC-format signal to be outputted. Therefore, an NTSC-format image signal can always be obtained by automatically judging the image format of the coded image data.

While in this twelfth embodiment an NTSC-format image is always obtained as an output image, it is possible to always obtain a PAL-format image signal as an output image by employing an NTSC/PAL conversion means instead of the PAL/NTSC conversion means, and an image conversion method described for any of the sixth to tenth embodiments.

Furthermore, while in this twelfth embodiment an NTSC-format image signal is always obtained as an output image, an NTSC-format image and a PAL-format image can be simultaneously obtained when the apparatus is constructed without the switch 1105.

While in the first to twelfth embodiments image conversion between the NTSC format and the PAL format has been described, the applicable range of the image conversion method and apparatus according to the present invention is not restricted to the NTSC format and the PAL format.

What is claimed is:

1. An image conversion method for converting an image format of an input image into a different image format of an output image, said method comprising:
   receiving the input image as a first interlaced scanning image having a field frequency of m (m: integer not less than 2) fields/sec;
   performing progressive scanning conversion for converting the first interlaced scanning image into a first progressive scanning image having a frame frequency of m frames/sec;
   performing frame frequency conversion for converting the first progressive scanning image into a second progressive scanning image having a frame frequency of n (n: integer not less than 1) frames/second, by thinning the first progressive scanning image in frame units; and
   performing interlaced scanning conversion for converting the second progressive scanning image into a second interlaced scanning image having a field frequency of 2n fields/sec, and outputting the second interlaced scanning image.

2. An image conversion method as defined in claim 1, wherein line frequency conversion for converting the line frequency of the input image into the line frequency of the image format of the output image is carried out, and thereafter, the progressive scanning conversion is carried out.

3. An image conversion method as defined in claim 1, wherein line frequency conversion for converting the line frequency of the progressive scanning image into the line frequency of the image format of the output image is carried out, and thereafter, the frame frequency conversion is carried out.

4. An image conversion method as defined in claim 1, wherein the progressive scanning conversion is performed simultaneously with line frequency conversion for converting the line frequency of the input image into the line frequency of the image format of the output image.

5. An image conversion method as defined in claim 1, wherein the first interlaced scanning image is a PAL-format image, and the second interlaced scanning image is an NTSC-format image.

6. An image conversion method as defined in claim 1, wherein the first interlaced scanning image is a PAL-format image, and the second progressive scanning image is a progressive scanning image having an NTSC-format image size.

7. An image conversion method as defined in claim 1, wherein the first interlaced scanning image is an NTSC-format image, and the second interlaced scanning image is a PAL-format image.

8. An image conversion method as defined in claim 1, wherein the first interlaced scanning image is an NTSC-format image, and the second progressive scanning image is a progressive scanning image having a PAL-format image size.

9. An image conversion method as defined in claim 1, wherein the image format of the input image is judged, and the conversion of the input image is carried out on the basis of the result of the judgement.

10. An image conversion method as defined in claim 9, wherein when the result of the judgement is that the input image is an NTSC-format image, the input image is converted into a PAL-format image, and when the result of the judgement is that the input image is a PAL-format image, the input image is converted into an NTSC-format image.

11. An image conversion method as defined in claim 10, wherein the image converted into the PAL format and the image converted into the NTSC format are outputted simultaneously.

12. An image conversion method as defined in claim 9, wherein when the image format of the input image is identical to the image format of the output image, the input image is outputted as the output image, and when the image format of the input image is different from the image format of the output image, the input image is converted into the image format of the output image.

13. An image conversion method for converting an image format of an input image into a different image format of an output image, said method comprising:

receiving the input image as a first interlaced scanning image having a field frequency of m (in: integer not less than 2) fields/sec;

performing progressive scanning conversion for converting the first interlaced scanning image into a first progressive scanning image having a frame frequency of m frames/sec; and performing frame frequency conversion for converting the first progressive scanning image into a second progressive scanning image having a frame frequency of n (n: integer not less than 1) frames/sec, by repeating or thinning the first progressive scanning image in frame units, and outputting the second progressive scanning image.

14. An image conversion method as defined in claim 13, wherein line frequency conversion for converting the line frequency of the input image into the line frequency of the image format of the output image is carried out, and thereafter, the progressive scanning conversion is carried out.

15. An image conversion method as defined in claim 13, wherein line frequency conversion for converting the line frequency of the progressive scanning image into the line frequency of the image format of the output image is carried out, and thereafter, the frame frequency conversion is carried out.

16. An image conversion method as defined in claim 13, wherein the progressive scanning conversion is performed simultaneously with line frequency conversion for converting the line frequency of the input image into the line frequency of the image format of the output image.

17. An image conversion method as defined in claim 13, wherein the first interlaced scanning image is a PAL-format image, and the second progressive scanning image is a progressive scanning image having an NTSC-format image size.

18. An image conversion method as defined in claim 13, wherein the first interlaced scanning image is an NTSC-format image, and the second progressive scanning image is a progressive scanning image having a PAL-format image size.

19. An image conversion method as defined in claim 13, wherein the image format of the input image is judged, and the conversion of the input image is carried out on the basis of the result of the judgement.

20. An image conversion method for converting an image format of an input image into a different image format of an output image, said method comprising:

receiving the input image as a first interlaced scanning image having a field frequency of m (m: integer not less than 2) fields/sec;

performing progressive scanning conversion for converting the first interlaced scanning image into a first progressive scanning image having a frame frequency of m frames/sec;

performing frame frequency conversion for converting the first progressive scanning image into a second progressive scanning image having a frame frequency of n (n: integer not less than 2) frames/sec, by repeating or thinning the first progressive scanning image in frame units;

performing interlaced scanning conversion for converting the second progressive scanning image into a second interlaced scanning image having a field frequency of n fields/sec; and outputting the second progressive scanning image and the second interlaced scanning image simultaneously.

21. An image conversion method as defined in claim 20, wherein line frequency conversion for converting the line frequency of the input image into the line frequency of the image format of the output image is carried out, and thereafter, the progressive scanning conversion is carried out.

22. An image conversion method as defined in claim 20, wherein line frequency conversion for converting the line frequency of the progressive scanning image into the line frequency of the image format of the output image is carried out, and thereafter, the frame frequency conversion is carried out.

23. An image conversion method as defined in claim 20, wherein the progressive scanning conversion is performed simultaneously with line frequency conversion for converting the line frequency of the input image into the line frequency of the image format of the output image.

24. An image conversion method as defined in claim 20, wherein the first interlaced scanning image is a PAL-format image, and the second interlaced scanning image is an NTSC-format image.

25. An image conversion method as defined in claim 20, wherein the first interlaced scanning image is a PAL-format image, and the second progressive scanning image is a progressive scanning image having an NTSC-format image size.

26. An image conversion method as defined in claim 20, wherein the first interlaced scanning image is an NTSC-format image, and the second interlaced scanning image is a PAL-format image.

27. An image conversion method as defined in claim 20, wherein the first interlaced scanning image is an NTSC-format image, and the second progressive scanning image is a progressive scanning image having a PAL-format image size.

28. An image conversion method as defined in claim 20, wherein the image format of the input image is judged, and the conversion of the input image is carried out on the basis of the result of the judgement.

29. An image conversion method for converting an image format of an input image into a different image format of an output image, said method comprising:

receiving the input image as a first interlaced scanning image having a field frequency of m (m: integer not less than 2) fields/sec and an image size of horizontal h pixels×vertical v pixels;

performing progressive scanning conversion for converting the first interlaced scanning image into a first progressive scanning image having a frame frequency of m frames/sec and an image size of horizontal i pixels×vertical w pixels;

performing frame frequency conversion for converting the first progressive scanning image into a second progressive scanning image having a frame frequency of n (n: integer not less than 1) frames/sec and an image size of horizontal i pixels×vertical w pixels, by thinning the first progressive scanning image in frame units; and performing interlaced scanning conversion for converting the second progressive scanning image into a second interlaced scanning image having a field frequency of 2n fields/sec and an image size of horizontal i pixels×vertical w pixels.

30. An image conversion method for converting an image format of an input image into a different image format of an output image, said method comprising:

receiving the input image as a first interlaced scanning image having a field frequency of m (m: integer not less than 2) fields/sec and an image size of horizontal h pixels×vertical v pixels;

performing progressive scanning conversion for converting the first interlaced scanning image into a first progressive scanning image having a frame frequency of m frames/sec and an image size of horizontal i pixels×vertical w pixels; and performing frame frequency conversion for converting the first progressive scanning image into a second progressive scanning image having a frame frequency of n (n: integer not less than 1) frames/sec and an image size of horizontal i pixels×vertical w pixels, by repeating or thinning the first progressive scanning image in frame units, and outputting the second progressive scanning image.

31. An image conversion method for converting an image format of an input image into a different image format of an output image, said method comprising:

receiving the input image as a first interlaced scanning image having a field frequency of m (m: integer not less than 2) fields/sec and an image size of horizontal h pixels×vertical v pixels;

performing progressive scanning conversion for converting the first interlaced scanning image into a first progressive scanning image having a frame frequency of m frames/sec and an image size of horizontal i pixels×vertical w pixels;

performing frame frequency conversion for converting the first progressive scanning image into a second progressive scanning image having a frame frequency of n (n: integer not less than 2) frames/sec and an image size of horizontal i pixels×vertical w pixels, by repeating or thinning the first progressive scanning image in frame units;

performing interlaced scanning conversion for converting the second progressive scanning image into a second interlaced scanning image having a field frequency of n fields/sec and an image size of horizontal i pixels×vertical w pixels; and outputting the second progressive scanning image and the second interlaced scanning image simultaneously.

32. An image conversion apparatus for converting an image format of an input image into a different image format of an output image, said apparatus comprising:

a progressive scanning converter operable to receive the input image as a first interlaced scanning image having a field frequency of m (m: integer not less than 2) fields/sec, and operable to convert the first interlaced scanning image into a first progressive scanning image having a frame frequency of m frames/sec;

a frame frequency converter operable to convert the first progressive scanning image into a second progressive scanning image having a frame frequency of n (n: integer not less than 1) frames/second, by thinning the first progressive scanning image in frame units; and an interlaced scanning converter operable to convert the second progressive scanning image into a second interlaced scanning image having a field frequency of 2n fields/sec, and operable to output the second interlaced scanning image.

33. An image conversion apparatus as defined in claim 32 further including a line frequency converter for converting the line frequency of the input image into the line frequency of the output image.

34. An image conversion apparatus as defined in claim 32, wherein the progressive scanning converter performs the progressive scanning conversion simultaneously with line frequency conversion for converting the line frequency of the input image into the line frequency.

35. An image conversion apparatus as defined in claim 32 further including a judgement means for judging the image format of the input image, and controlling the whole apparatus to perform conversion of the input image on the basis of the result of the judgement.

36. An image conversion apparatus as defined in claim 35, wherein the judgement means judges whether the image format of the input image is the NTSC format or the PAL format, controls the whole apparatus so as to perform image conversion into the PAL format when the image format of the input image is the NTSC format, and controls the whole apparatus so as to perform image conversion into the NTSC format when the image format of the input image is the PAL format.

37. An image conversion apparatus as defined in claim 36, wherein the judgement means controls the whole apparatus to output the image converted into the NTSC format and the image converted into the PAL format simultaneously.

38. An image conversion apparatus as defined in claim 35, wherein the judgement means judges whether or not the image format of the input image is identical to the image format of the output image, controls the whole apparatus so as to output the input image as the output image when the image format of the input image is identical to the image format of the output image, and controls the whole apparatus so as to convert the input image into the image format of the output image when the image format of the input image is different from the image format of the output image.

39. An image conversion apparatus for converting an image format of an input image into a different image format of an output image, said apparatus comprising:

a progressive scanning converter operable to receive the input image as a first interlaced scanning image having a field frequency of m (m: integer not less than 2) fields/sec, and operable to convert the first interlaced scanning image into a first progressive scanning image having a frame frequency of m frames/sec; and a frame frequency converter operable to convert the first progressive scanning image into a second progressive scanning image having a frame frequency of n (n:

integer not less than 1) frames/sec, by repeating or thinning the first progressive scanning image in frame units, and operable to output the second progressive scanning image.

40. An image conversion apparatus as defined in claim 39 further including a line frequency converter for converting the line frequency of the input image into the line frequency of the output image.

41. An image conversion apparatus as defined in claim 39, wherein the progressive scanning converter performs the progressive scanning conversion simultaneously with line frequency conversion for converting the line frequency of the input image into the line frequency.

42. An image conversion apparatus as defined in claim 39 further including a judgement means for judging the image format of the input image, and controlling the whole apparatus to perform conversion of the input image on the basis of the result of the judgement.

43. An image conversion apparatus for converting an image format of an input image into a different image format of an output image, said apparatus comprising:
 a progressive scanning converter operable to receive the input image as a first interlaced scanning image having a field frequency of m (m: integer not less than 2) fields/sec, and operable to convert the first interlaced scanning image into a first progressive scanning image having a frame frequency of in frames/sec;
 a frame frequency converter operable to convert the first progressive scanning image into a second progressive scanning image having a frame frequency of n (n: integer not less than 2) frames/sec, by repeating or thinning the first progressive scanning image in frame units; and
 an interlaced scanning converter operable to convert the second progressive scanning image into a second interlaced scanning image having a field frequency of n fields/sec, and operable to output the second interlaced scanning image simultaneously with the second progressive scanning image.

44. An image conversion apparatus as defined in claim 43 further including a line frequency converter for converting the line frequency of the input image into the line frequency of the output image.

45. An image conversion apparatus as defined in claim 43, wherein the progressive scanning converter performs the progressive scanning conversion simultaneously with line frequency conversion for converting the line frequency of the input image into the line frequency.

46. An image conversion apparatus as defined in claim 43 further including a judgement means for judging the image format of the input image, and controlling the whole apparatus to perform conversion of the input image on the basis of the result of the judgement.

47. An image conversion apparatus for converting an image format of an input image into a different image format of an output image, said apparatus comprising:
 a progressive scanning converter operable to receive the input image as a first interlaced scanning image having a field frequency of m (m: integer not less than 2) fields/sec and an image size of horizontal h pixels× vertical v pixels, and operable to convert the first interlaced scanning image into a first progressive scanning image having a frame frequency of m frames/sec and an image size of horizontal i pixels×vertical w pixels;
 a frame frequency converter operable to convert the first progressive scanning image into a second progressive scanning image having a frame frequency of n (n: integer not less than 1) frames/sec and an image size of horizontal i pixels×vertical w pixels, by thinning the first progressive scanning image in frame units; and
 an interlaced scanning converter operable to convert the second progressive scanning image into a second interlaced scanning image having a field frequency of 2n fields/sec and an image size of horizontal i pixels× vertical w pixels, and operable to output the second interlaced scanning image.

48. An image conversion apparatus as defined in claim 47 further including a line frequency converter for converting the line frequency of the input image into the line frequency of the output image.

49. An image conversion apparatus as defined in claim 47, wherein the progressive scanning converter performs the progressive scanning conversion simultaneously with line frequency conversion for converting the line frequency of the input image into the line frequency.

50. An image conversion apparatus as defined in claim 47 further including a judgement means for judging the image format of the input image, and controlling the whole apparatus to perform conversion of the input image on the basis of the result of the judgement.

51. An image conversion apparatus for converting an image format of an input image into a different image format of an output image, said apparatus comprising:
 a progressive scanning converter operable to receive the input image as a first interlaced scanning image having a field frequency of m (m: integer not less than 2) fields/sec and an image size of horizontal h pixels× vertical v pixels, and operable to convert the first interlaced scanning image into a first progressive scanning image having a frame frequency of m frames/sec and an image size of horizontal i pixels×vertical w pixels; and
 a frame frequency converter operable to convert the first progressive scanning image into a second progressive scanning image having a frame frequency of n (n: integer not less than 1) frames/sec and an image size of horizontal i pixels×vertical w pixels, by repeating or thinning the first progressive scanning image in frame units, and operable to output the second progressive scanning image.

52. An image conversion apparatus as defined in claim 51 further including a line frequency converter for converting the line frequency of the input image into the line frequency of the output image.

53. An image conversion apparatus as defined in claim 51, wherein the progressive scanning converter performs the progressive scanning conversion simultaneously with line frequency conversion for converting the line frequency of the input image into the line frequency.

54. An image conversion apparatus as defined in claim 51 further including a judgement means for judging the image format of the input image, and controlling the whole apparatus to perform conversion of the input image on the basis of the result of the judgement.

55. An image conversion apparatus for converting an image format of an input image into a different image format of an output image, said apparatus comprising:
 a progressive scanning converter operable to receive the input image as a first interlaced scanning image having a field frequency of m (m: integer not less than 2) fields/sec and an image size of horizontal h pixels× vertical v pixels, and operable to convert the first interlaced scanning image into a first progressive scanning image having a frame frequency of m frames/sec and an image size of horizontal i pixels×vertical w pixels;

a frame frequency converter operable to convert the first progressive scanning image into a second progressive scanning image having a frame frequency of n (n: integer not less than 2) frames/sec and a screen size of horizontal i pixels×vertical w pixels, by repeating or thinning the first progressive scanning image in frame units; and an interlaced scanning converter operable to convert the second progressive scanning image into a second interlaced scanning image having a field frequency of n fields/sec and an image size of horizontal i pixels× vertical w pixels, and operable to output the second interlaced scanning image simultaneously with the second progressive scanning image.

56. An image conversion apparatus as defined in claim 55 further including a line frequency converter for converting the line frequency of the input image into the line frequency of the output image.

57. An image conversion apparatus as defined in claim 55, wherein the progressive scanning converter performs the progressive scanning conversion simultaneously with line frequency conversion for converting the line frequency of the input image into the line frequency.

58. An image conversion apparatus as defined in claim 55 further including a judgement means for judging the image format of the input image, and controlling the whole apparatus to perform conversion of the input image on the basis of the result of the judgement.

* * * * *

UNITED STATES PATENT AND TRADEMARK OFFICE
CERTIFICATE OF CORRECTION

PATENT NO. : 7,012,648 B2  Page 1 of 1
APPLICATION NO. : 10/109855
DATED : March 14, 2006
INVENTOR(S) : Satoshi Kondo et al.

It is certified that error appears in the above-identified patent and that said Letters Patent is hereby corrected as shown below:

In Column 33, line 27 "a frame frequency of in frames/sec;" should read --a frame frequency of m frames/sec;--.

Signed and Sealed this

Fifteenth Day of August, 2006

JON W. DUDAS
*Director of the United States Patent and Trademark Office*